(12) United States Patent
Nakamura

(10) Patent No.: US 11,189,254 B2
(45) Date of Patent: Nov. 30, 2021

(54) VIDEO PROCESSING DEVICE, DISPLAY DEVICE, VIDEO PROCESSING METHOD, AND RECORDING MEDIUM

(71) Applicant: SHARP KABUSHIKI KAISHA, Sakai (JP)

(72) Inventor: Tatsunori Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/759,661

(22) PCT Filed: Oct. 26, 2018

(86) PCT No.: PCT/JP2018/039954
§ 371 (c)(1),
(2) Date: Apr. 27, 2020

(87) PCT Pub. No.: WO2019/087984
PCT Pub. Date: May 9, 2019

(65) Prior Publication Data
US 2021/0134251 A1   May 6, 2021

(30) Foreign Application Priority Data
Nov. 1, 2017   (JP) .............................. JP2017-212113

(51) Int. Cl.
*G09G 5/397* (2006.01)
*G06T 1/20* (2006.01)

(52) U.S. Cl.
CPC .............. *G09G 5/397* (2013.01); *G06T 1/20* (2013.01); *G09G 2360/122* (2013.01); *G09G 2360/18* (2013.01)

(58) Field of Classification Search
CPC .............. G09G 5/397; G09G 2360/00; G09G 2360/122; G09G 2360/18; H04N 5/06; H04N 5/08
See application file for complete search history.

(56) References Cited

U.S. PATENT DOCUMENTS 8,390,532 B2 * 3/2013 Hanamura ............... G09G 3/32
345/1.1
2003/0231259 A1 * 12/2003 Yui ..................... H04N 5/44504
348/564

(Continued)

FOREIGN PATENT DOCUMENTS

JP   2015-184668 A   10/2015
JP   2016-184775 A   10/2016

(Continued)

*Primary Examiner* — Kevin M Nguyen
(74) *Attorney, Agent, or Firm* — ScienBiziP, P.C.

(57) ABSTRACT

A video processing device processing input videos, includes a video processing unit that processes the input videos; and a control unit that sets a control value for controlling the video processing unit, wherein an entire input video is constituted by combining the input videos, and among partial areas associated with the respective input videos constituting the entire input video, one of the partial areas is defined as a first partial area, and another of the partial areas adjacent to, the first partial area is defined as a second partial area, and when processing which is performed, by referring to a pixel value in one of the first partial area and the second partial area, on another of the first partial area and the second partial area, is defined as adjacent boundary processing, the video processing unit performs the adjacent boundary processing on the entire input video, and generates processed videos.

11 Claims, 17 Drawing Sheets

(56) References Cited

U.S. PATENT DOCUMENTS

2016/0357493 A1*  12/2016  Zerwas ................. G06F 3/1438
2017/0125064 A1*   5/2017  Aggarwal ........ H04N 5/232945
2017/0294176 A1   10/2017  Ito

FOREIGN PATENT DOCUMENTS

JP         2017-044995 A      3/2017
JP         2017-191145 A     10/2017

* cited by examiner

FIG.9
(a)
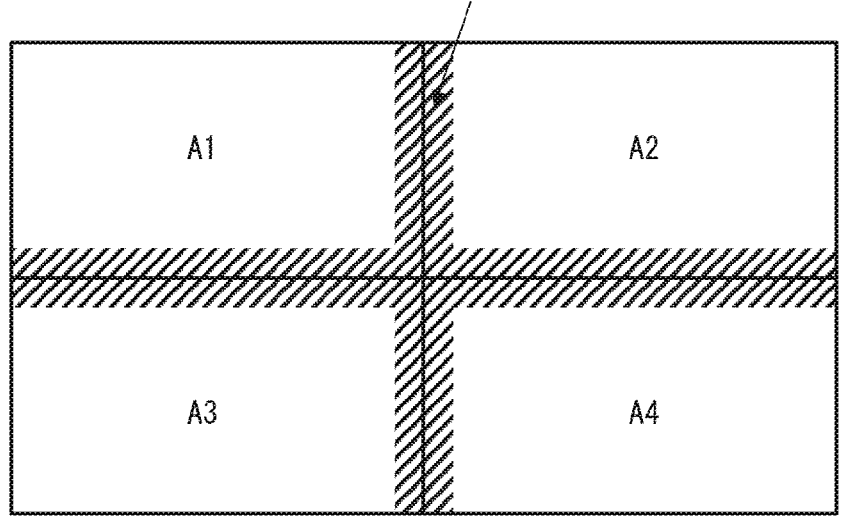
ADJACENT BOUNDARY PROCESSING
(b)
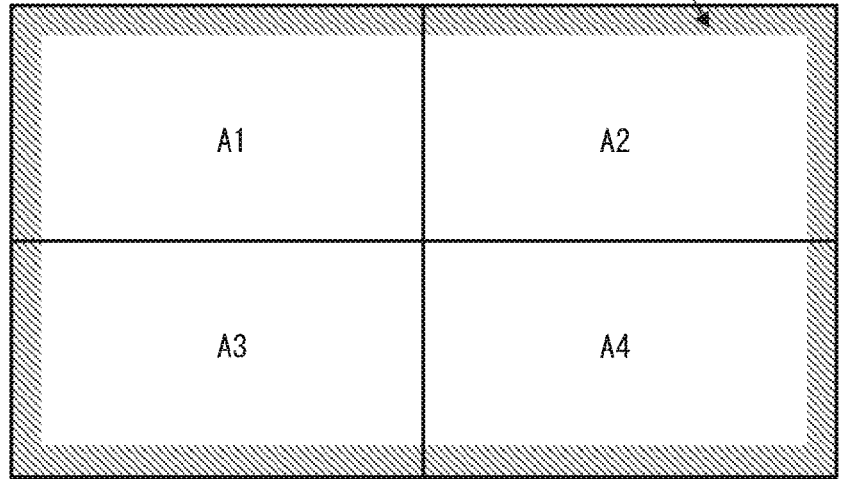
BOUNDARY PROCESSING FIG.10
(a)
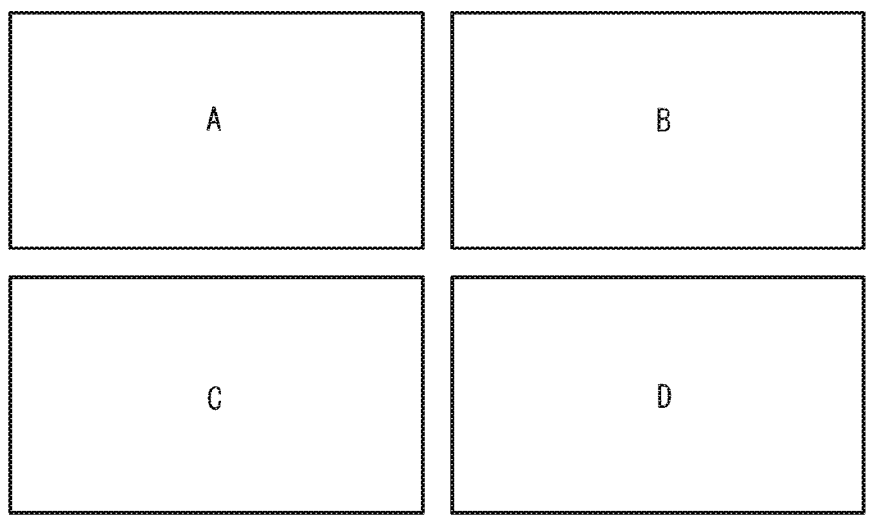
NO ADJACENT BOUNDARY PROCESSING IS PERFORMED.
(b)
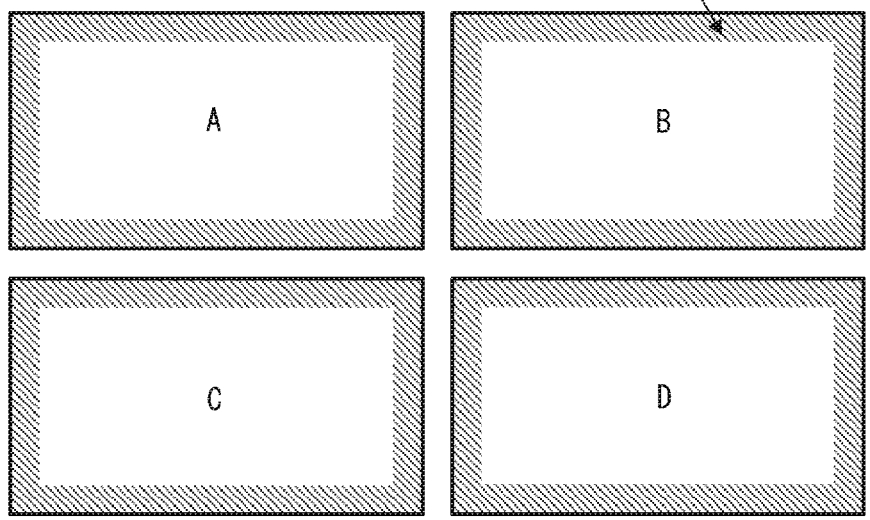

VIDEO PROCESSING DEVICE, DISPLAY DEVICE, VIDEO PROCESSING METHOD, AND RECORDING MEDIUM

TECHNICAL FIELD

The following disclosure relates to a video processing device that processes each of a plurality of input videos.

BACKGROUND ART

In general, PTL 1 discloses a video processing device for efficiently processing a plurality of video data pieces.

CITATION LIST

Patent Literature

PTL 1: Japanese Unexamined Patent Application Publication No. 2016-184775

SUMMARY OF INVENTION

Technical Problem

There is still room for improvement to improve the display quality of a video processed by a video processing device. An object of one aspect of the present disclosure is to provide a video with a more superior display quality than in the related art.

Solution to Problem

According to an aspect of the present disclosure, there is provided a video processing device processing a plurality of input videos, including: a video processing unit that processes each of the plurality of input videos; and a control unit that sets a control value for controlling the video processing unit, in which an entire input video is constituted by combining the plurality of input videos, and when in the entire input video, among a plurality of partial areas associated with the plurality of respective input videos constituting the entire input video, (i) one of the partial areas is defined as a first partial area, and (ii) another of the partial areas adjacent to the first partial area is defined as a second partial area, and when processing which is performed, by referring to a pixel value in one of the first partial area and the second partial area, on another of the first partial area and the second partial area at a boundary between the first partial area and the second partial area, is defined as adjacent boundary processing, the video processing unit performs the adjacent boundary processing on the entire input video according to the control value, and generates a plurality of processed videos.

According to another aspect of the present disclosure, there is provided a video processing method for processing a plurality of input videos, including: a video processing step of processing each of the plurality of input videos; and a control step of setting a control value for controlling the video processing step, in which an entire input video is constituted by combining the plurality of input videos, and when in the entire input video, among a plurality of partial areas associated with the plurality of respective input videos constituting the entire input video, (i) one of the partial areas is defined as a first partial area, and (ii) another of the partial areas adjacent to the first partial area is defined as a second partial area, and when processing which is performed, by referring to a pixel value in one of the first partial area and the second partial area, on another of the first partial area and the second partial area at a boundary, between the first partial area and the second partial area, is defined as adjacent boundary processing, the video processing step further includes steps of performing the adjacent boundary processing on the entire input video according to the control value, and generating a plurality of processed videos.

Advantageous Effects of Invention

In accordance with a video processing device according to an aspect of the present disclosure, it is possible to provide a video with a more superior display quality than in the related art. In addition, the similar effect is achieved by a video processing method according to another aspect of the present disclosure.

Each of FIGS. 5(a) and 5(b) is a diagram for explaining boundary processing.

Figure 6:
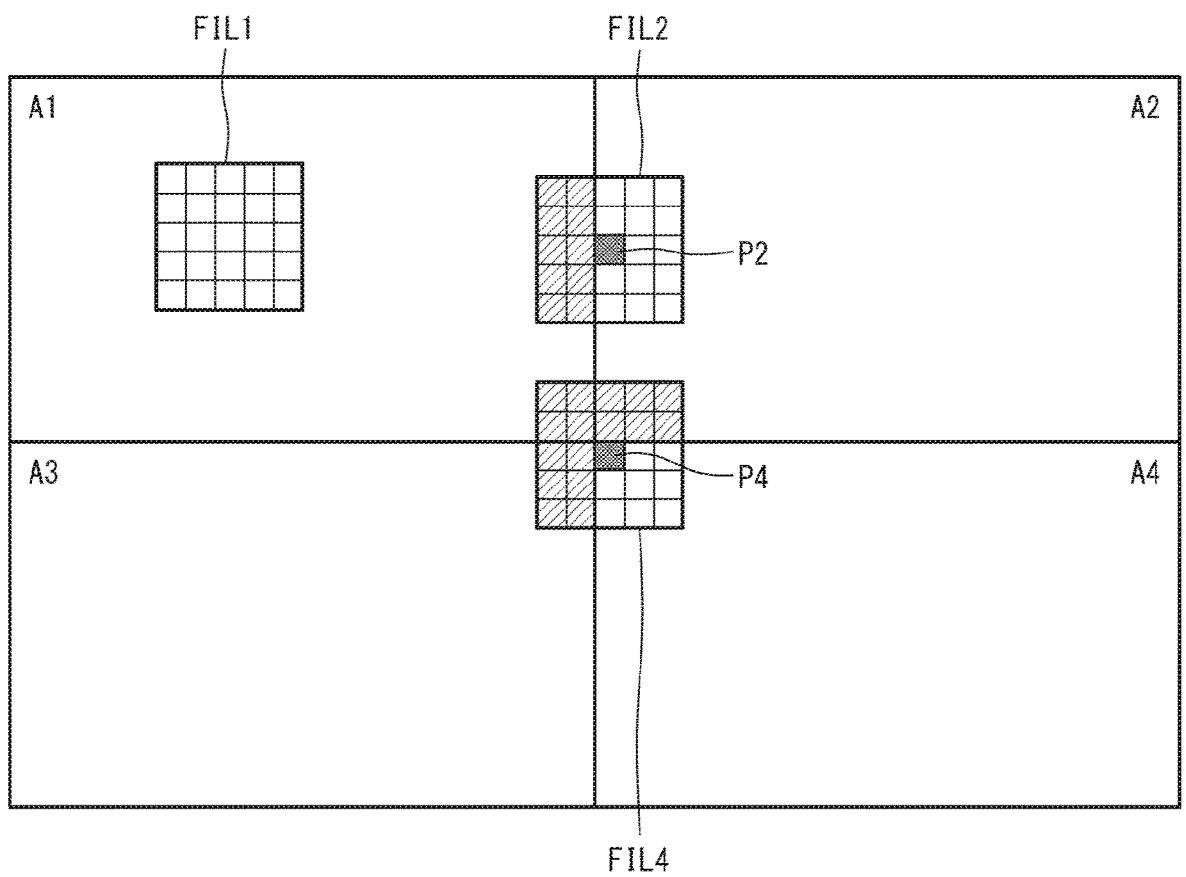

FIG. 6 is a diagram for explaining adjacent boundary processing.

Figure 7:
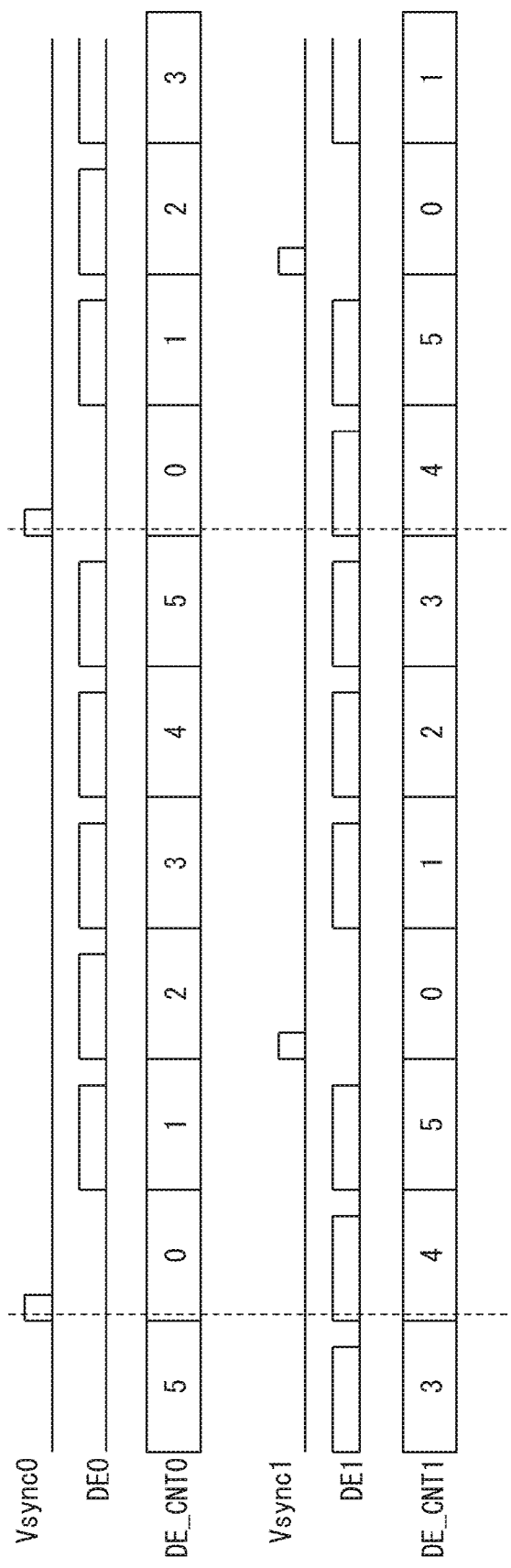

FIG. 7 is a diagram for explaining a synchronization determination method focusing on the skew of a vertical synchronization signal between the plurality of input videos.

Figure 1:
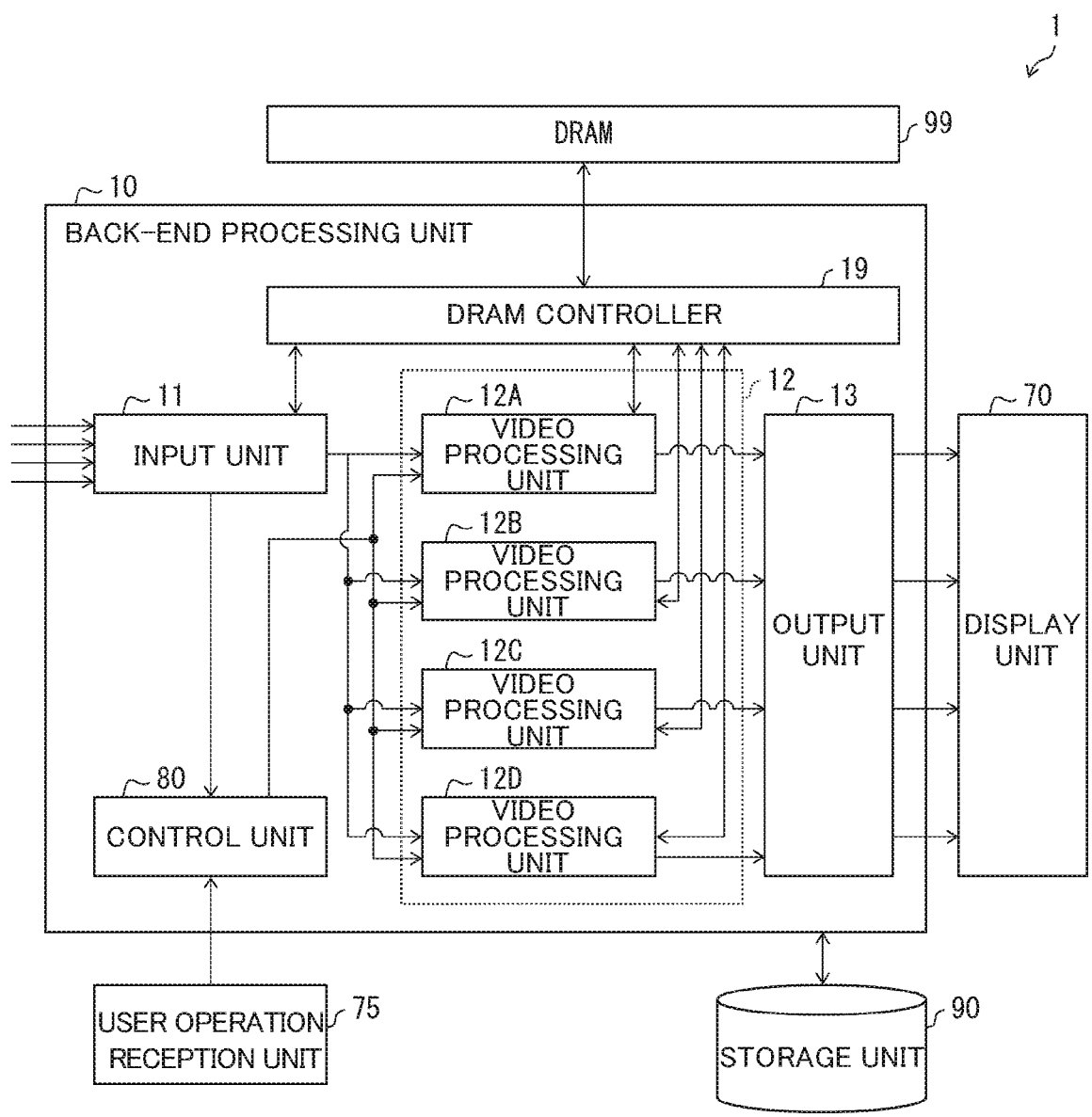
FIG. 1 is a functional block diagram showing a configuration of a main part of a display device according to Embodiment 1.

Each of FIGS. 8(a) and 8(b) is a flowchart showing an example of a processing flow in the display device in FIG. 1.

Each of FIGS. 9(a) and 9(b) is a diagram showing a state of video processing when the plurality of input videos are synchronous videos.

Each of FIGS. 10(a) and 10(b) is a diagram showing a state of video processing when the plurality of input videos are asynchronous videos.

Figure 11:
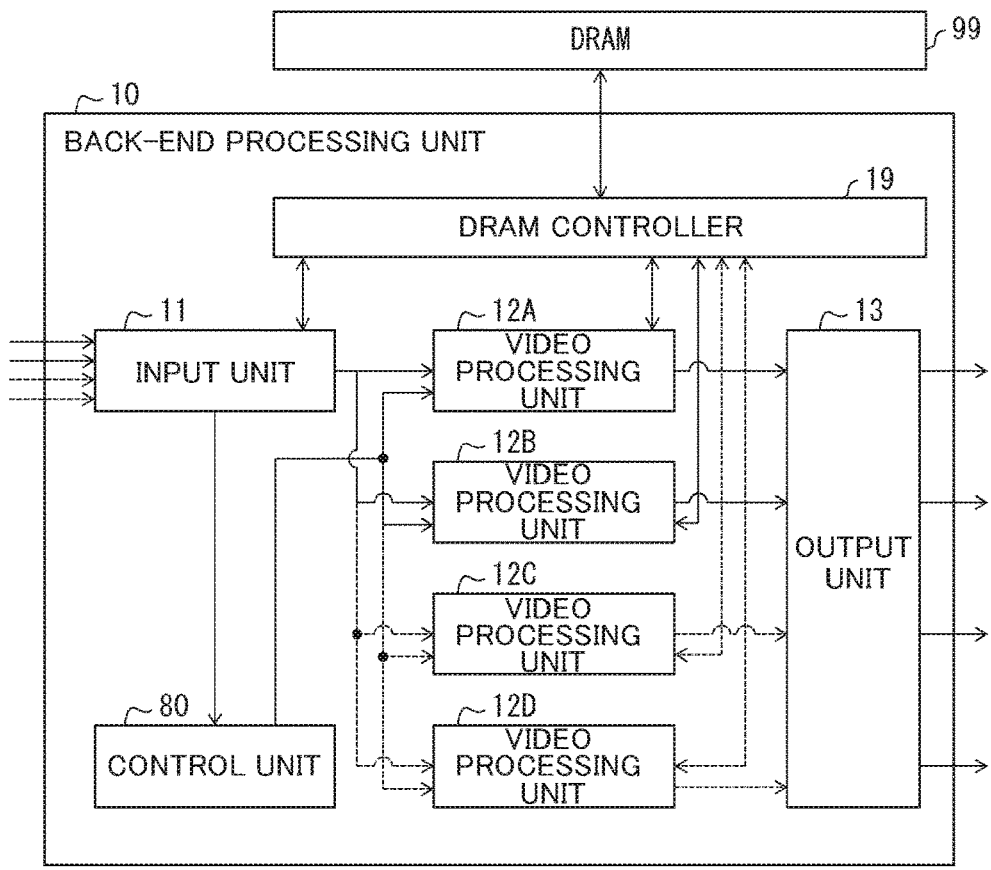

FIG. 11 is a diagram for explaining an input video and an output video in a display device according to Embodiment 2.

Figure 12:
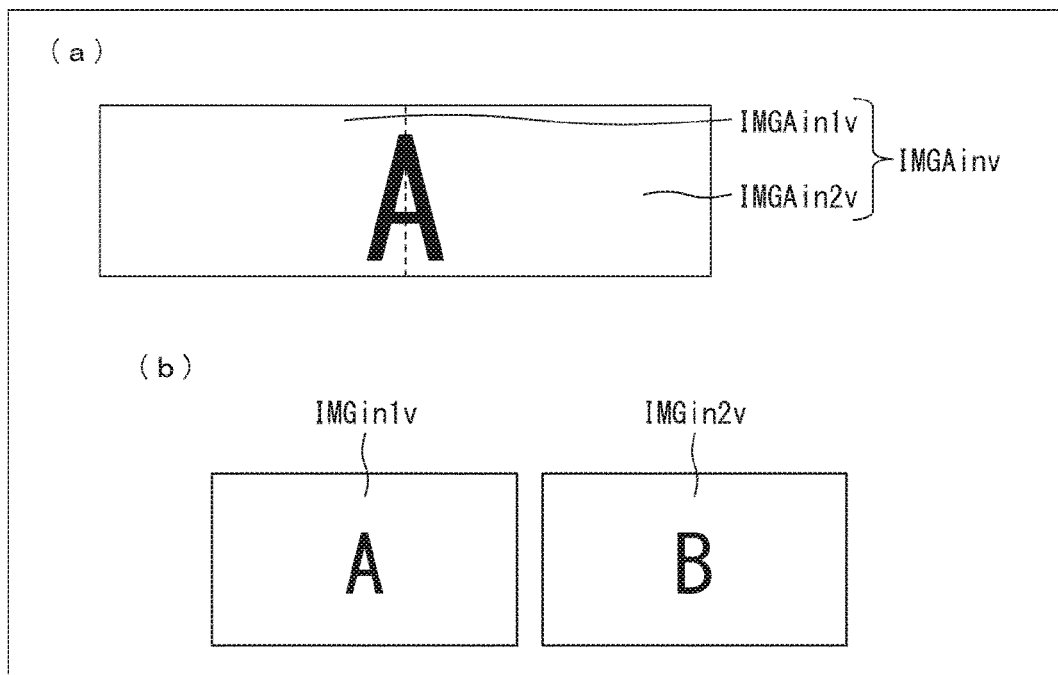

FIG. 12(a) is a diagram showing one entire input video constituted by a plurality of input videos as a synchronous video, and FIG. 12(b) is a diagram showing an example of a plurality of input videos as an asynchronous video.

Figure 13:
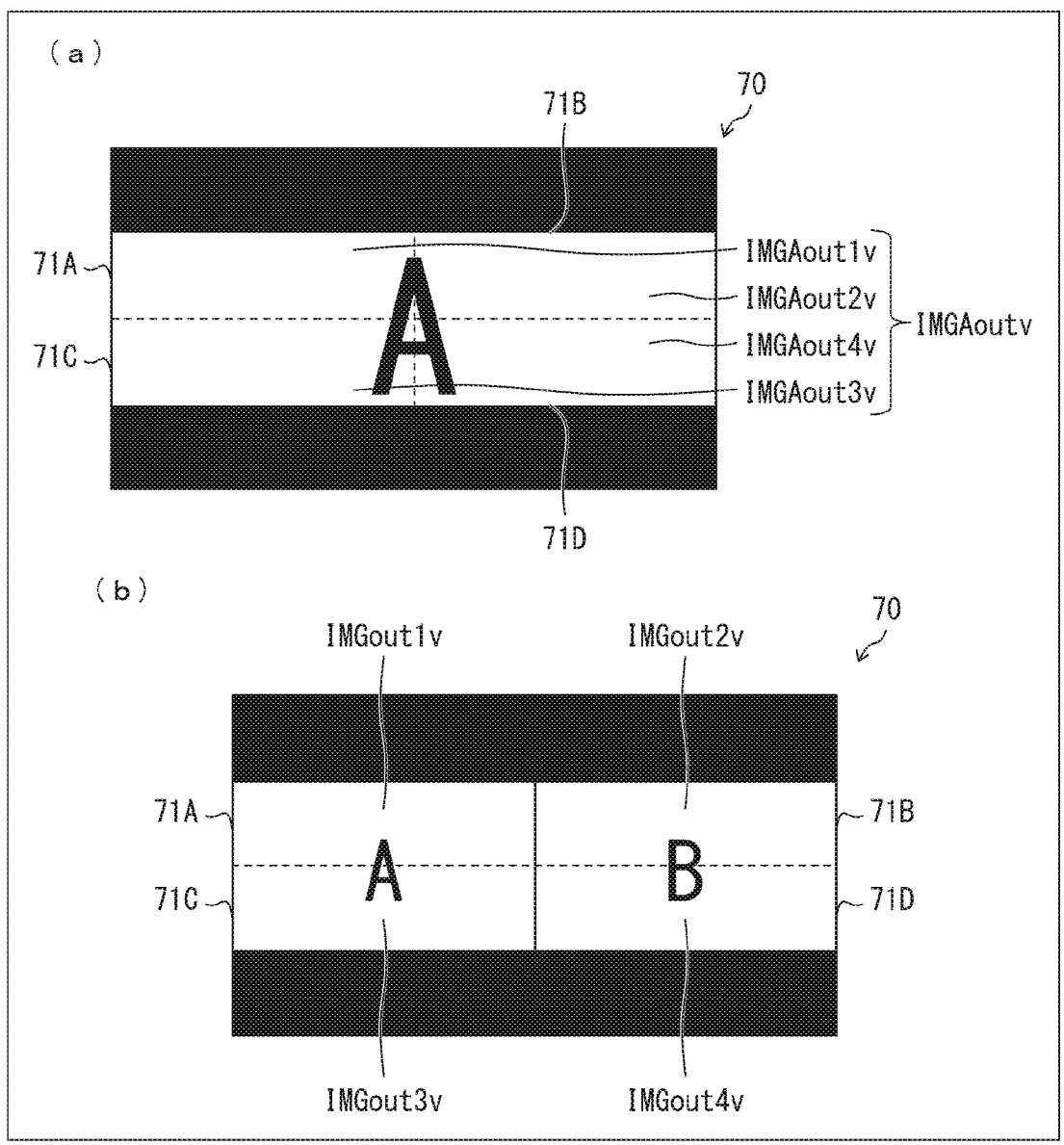

FIG. 13(a) is a diagram showing one entire output video constituted by a plurality of output videos as a synchronous video, and FIG. 13(b) is a diagram showing an example of a plurality of output videos as an asynchronous video.

Each of FIGS. 14(a) and 14(b) is a diagram showing a state of video processing when the plurality of input videos are synchronous videos.

Each of FIGS. 15(a) and 15(b) is a diagram showing a state of video processing when the plurality of input videos are asynchronous videos.

Figure 16:
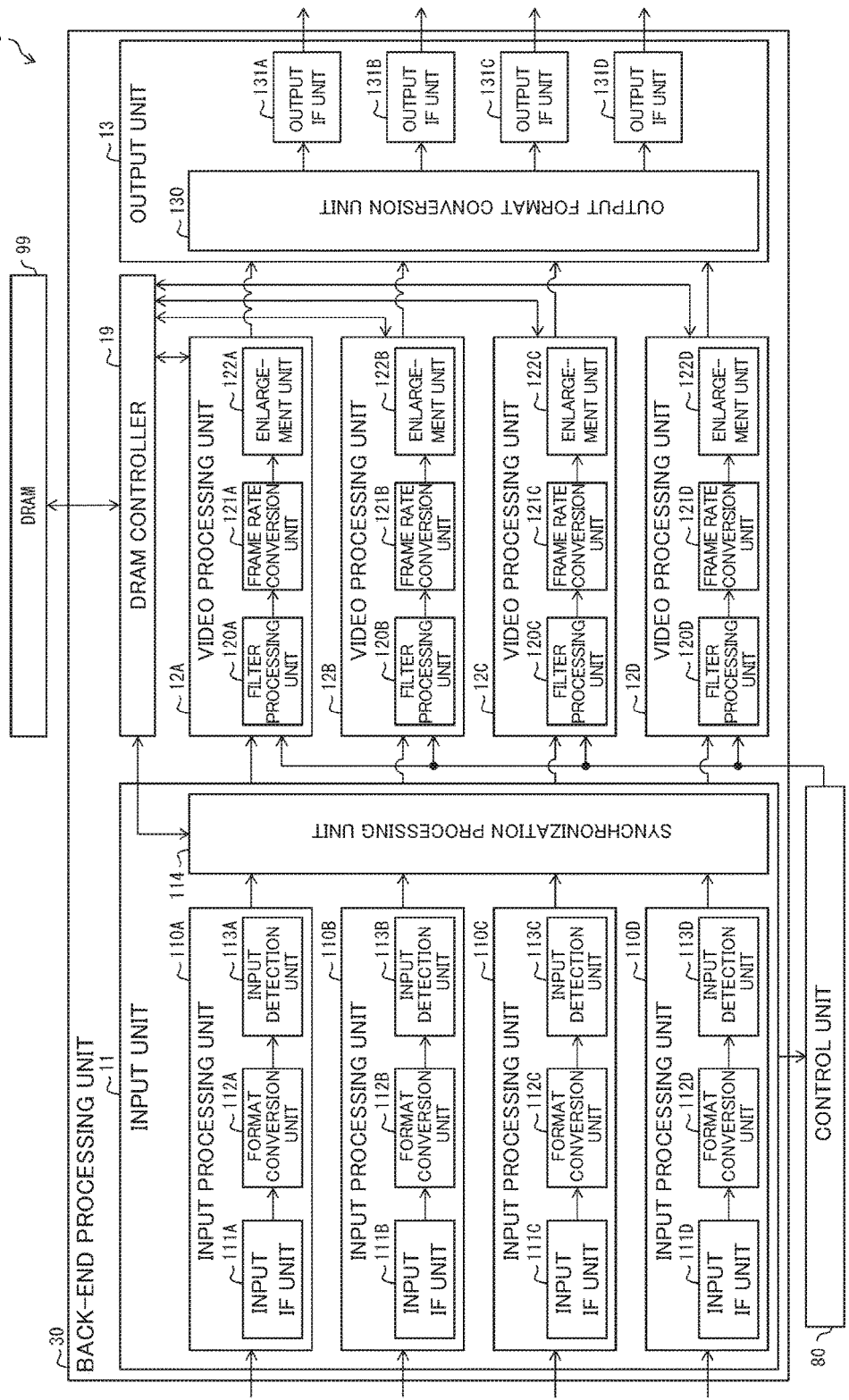

FIG. 16 is a functional block diagram showing a configuration of a display device according to Embodiment 3.

Figure 17:
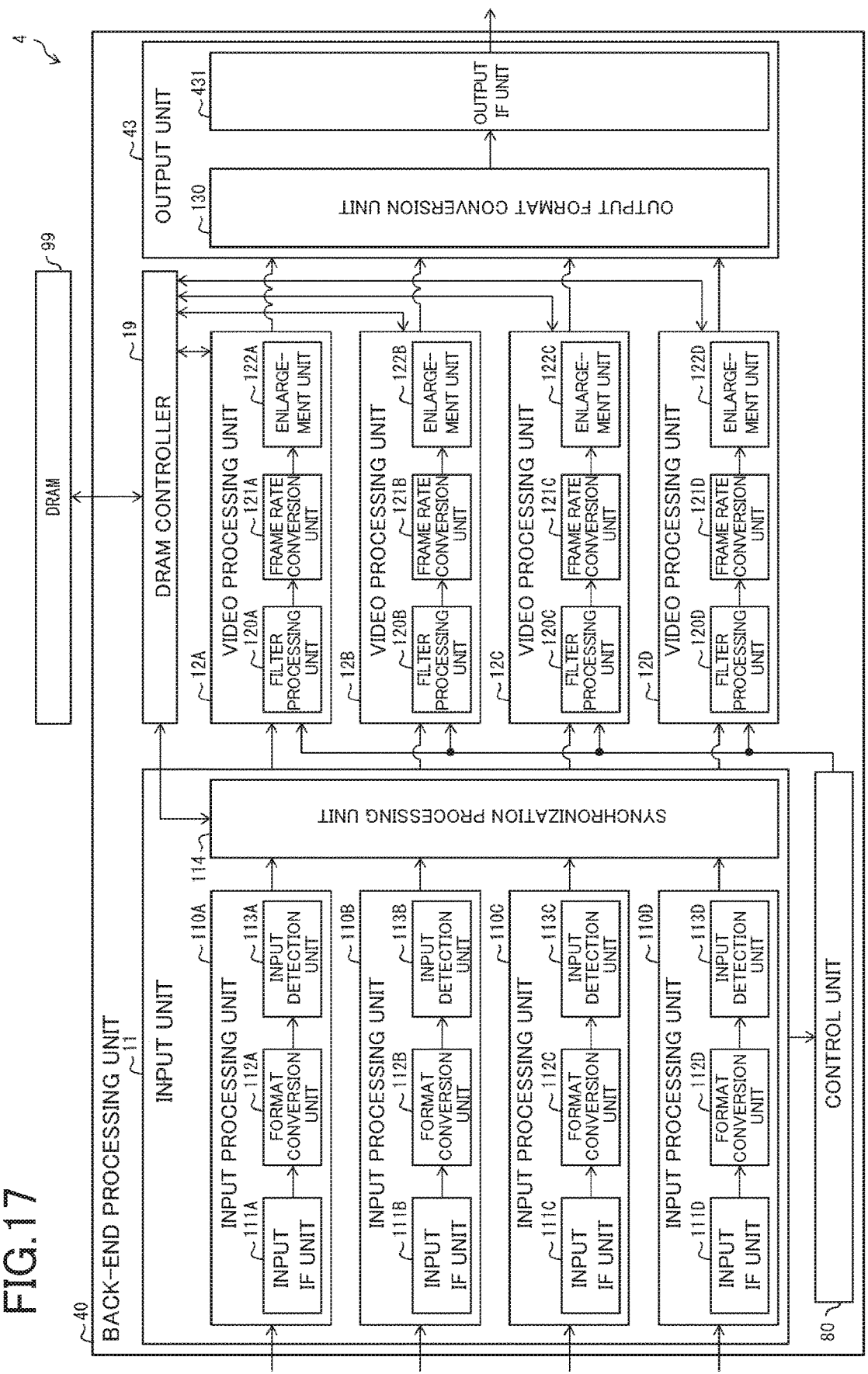

FIG. 17 is a functional block diagram showing a configuration of a display device according to Embodiment 4.

Figure 18:
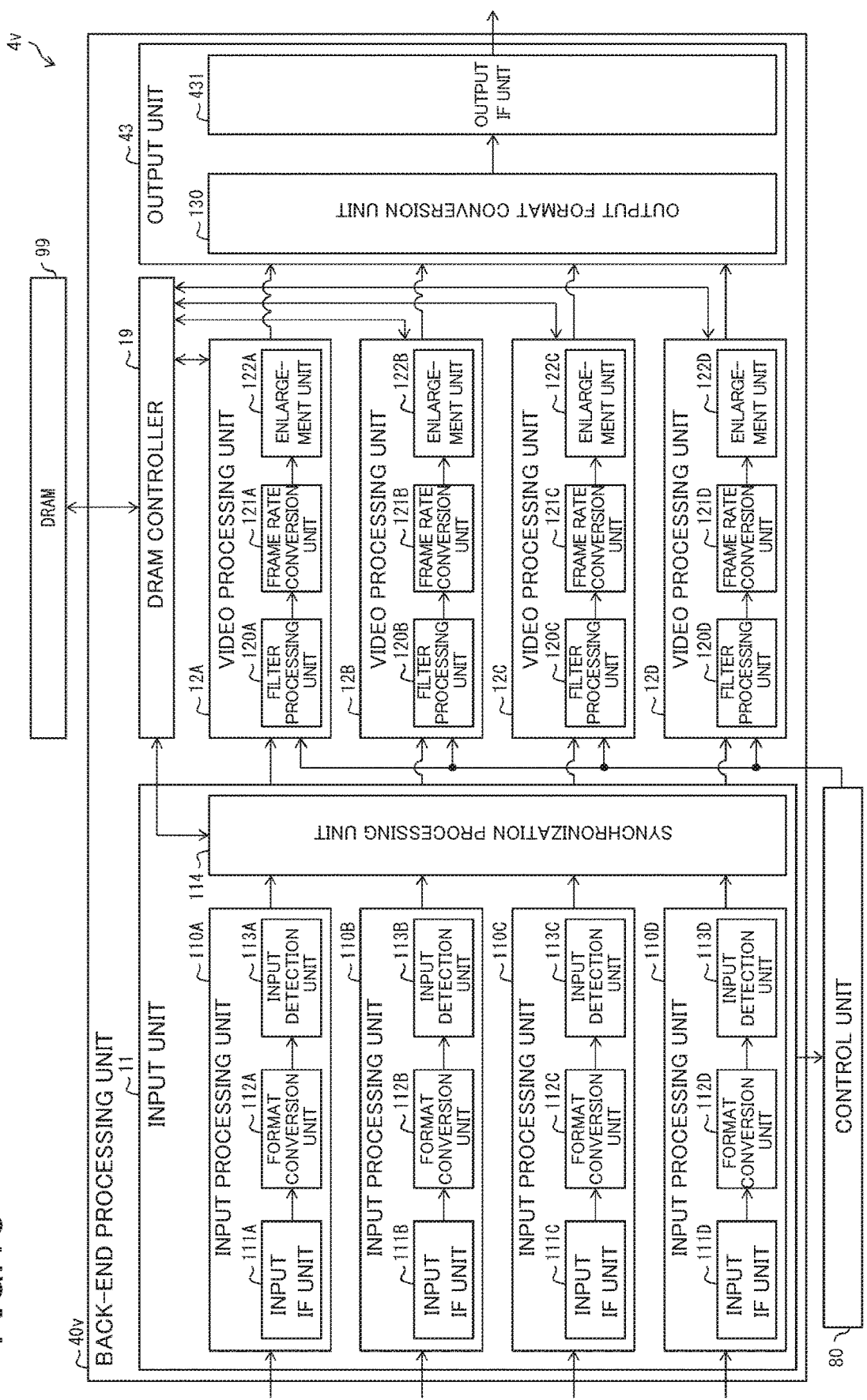

FIG. 18 is a functional block diagram showing a configuration of a display device according to one modification example of Embodiment 4.

DESCRIPTION OF EMBODIMENTS

Embodiment 1

Hereinafter, a display device 1 according to Embodiment 1 will be described. For the convenience of description, in the following embodiments, members having the same functions as the members described in Embodiment 1 will be denoted by the same reference numerals, and description thereof will not be repeated.

Overview of Display Device 1

FIG. 1 is a functional block diagram showing a configuration of a main part of a display device 1. The display device 1 includes a back-end processing unit 10 (video processing device), a display unit 70, a user operation reception unit 75, a storage unit 90, and a dynamic random access memory (DRAM) 99. Note that a "video" may be referred to as a "moving image".

The back-end processing unit 10 acquires a plurality of videos more specifically, video signals) input to the back-end processing unit 10 (display device 1) from outside. Hereinafter, the video input to the back-end processing unit 10 is referred to as an input video.

The back-end processing unit 10 processes a plurality of input videos and outputs a plurality of processed videos to the display unit 70. Hereinafter, the processed video output from the back-end processing unit 10 (more specifically, the output unit 13 described later) to the display unit 70 is referred to as an output video. The display unit 70 acquires an output video from the back-end processing unit 10 and displays the output video.

The back-end processing unit 10 includes an input unit 11, video processing units 12A to 12D, an output unit 13, a DRAM controller 19, and a control unit 80 (video processing device). The video processing units 12A to 12D may be collectively referred to as a video processing unit 12. The detailed configuration of the back-end processing unit 10 will be described later. The back end processing unit 10 and the control unit 80 may be collectively referred to as a video processing device.

Embodiment 1 exemplifies as an example a case where four input videos (hereinafter, a first input video to a fourth input video) are input to the back-end processing unit 10. Further, it is assumed that four output videos (hereinafter, a first output video to a fourth output video) are output from the back-end processing unit 10. The first to fourth output videos are videos obtained by the back-end processing unit 10 processing the respective first to fourth input videos.

Embodiment 1 exemplifies as an example a case where each of the first to fourth input videos and the first to fourth output videos is a 4K2K video (a video having a resolution of 4K2K). "4K2K" means a resolution of "3840 horizontal pixels×2160 vertical pixels".

In contrast to this, "8K4K" means a resolution of "7680 horizontal pixels×4320 vertical pixels". One 8K4K video (video having a resolution of 8K4K) can be expressed as a video constituted by four (two in the horizontal direction and two in the vertical direction) 4K2K videos (for example, see FIG. 3(a) described later).

Therefore, by combining the first to fourth input videos, an input video (entire input video) as one 8K4K video can be expressed. Similarly, by combining the first output video to the fourth output video, an output video (entire output video) as one 8K4K video can be expressed.

Figure 4:
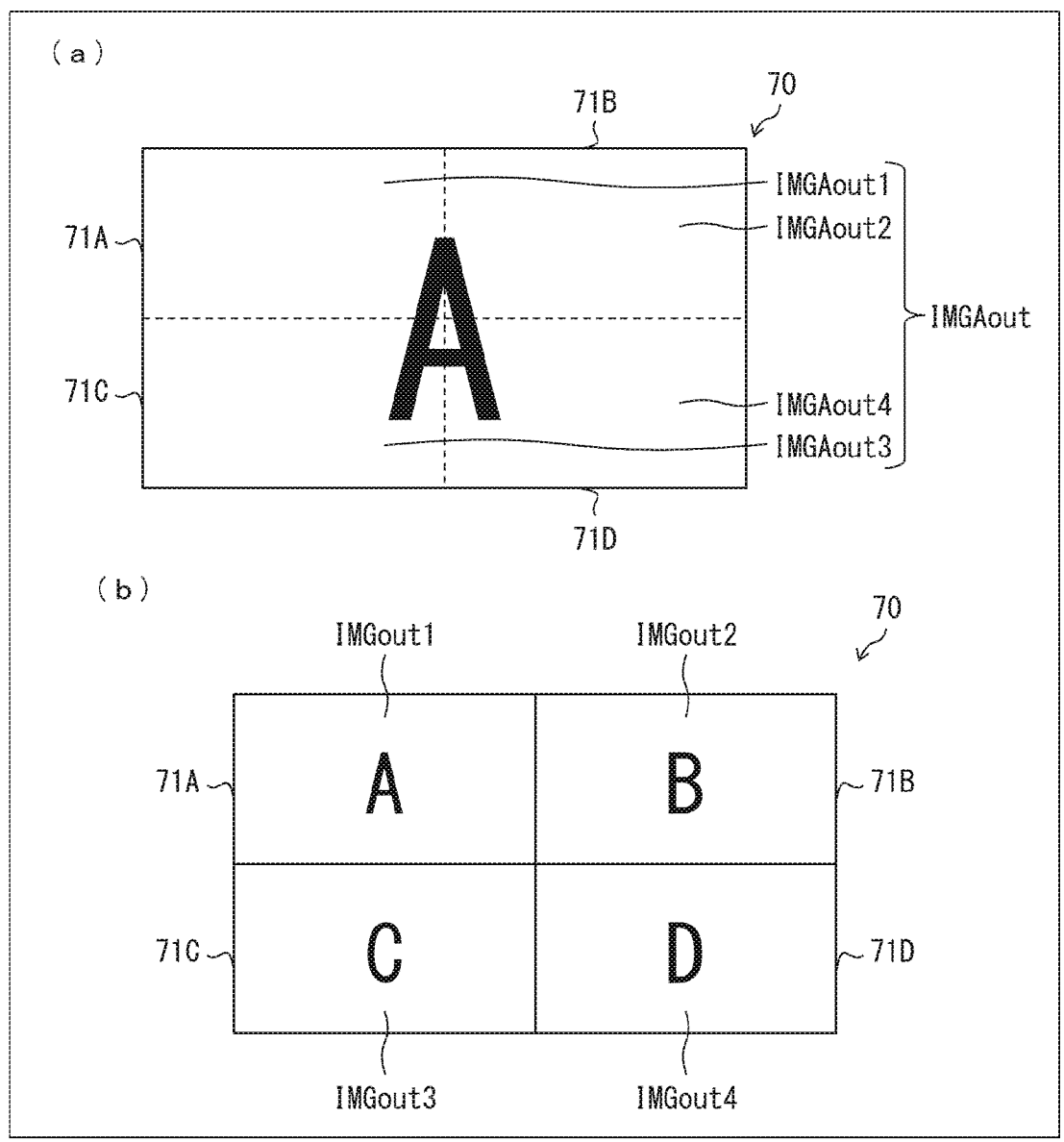
FIG. 4(a) is a diagram showing one entire output video constituted by a plurality of output videos as a synchronous video, and FIG. 4 (b) is a diagram showing an example of a plurality of output videos as an asynchronous video.

In Embodiment 1, the display unit 70 is an 8K4K display (display having a resolution of 8K4K) capable of displaying 8K4K video. A display surface (display area, display screen) of the display unit 70 is divided into four (two in the horizontal direction and two in the vertical direction) partial display areas (partial display areas 71A to 71D in FIG. 4 described later).

Each of the partial display areas 71A to 71D is a display area having a resolution of 4K2K. In Embodiment 1, it is assumed that the partial display areas 71A to 71D is associated one-to-one with a plurality of respective input videos (for example, first to fourth input videos). Therefore, the partial display areas 71A to 71D can display a plurality of respective output videos (for example, first to fourth output videos).

The user operation reception unit 75 receives an operation of a user (hereinafter, user operation). The user operation is an operation by using an infrared remote controller or the like for operating the display device 1. The control unit 80 collectively controls each unit of the display device 1. A command corresponding to a user operation may be given from the user operation reception unit 75 to the control unit 80. The storage unit 90 stores various programs executed by the control unit 80 and data used by the programs.

The DRAM 99 temporarily stores the video being processed by the back-end processing unit 10. The DRAM 99 functions as a frame memory for storing each frame of the video. As the DRAM 99, a known double data rate (DDR) memory is used. The DRAM controller 19 of the back-end processing unit 10 controls an operation of the DRAM 99 (in particular, reading and writing of each frame of a video).

Back-End Processing Unit 10

Figure 2:
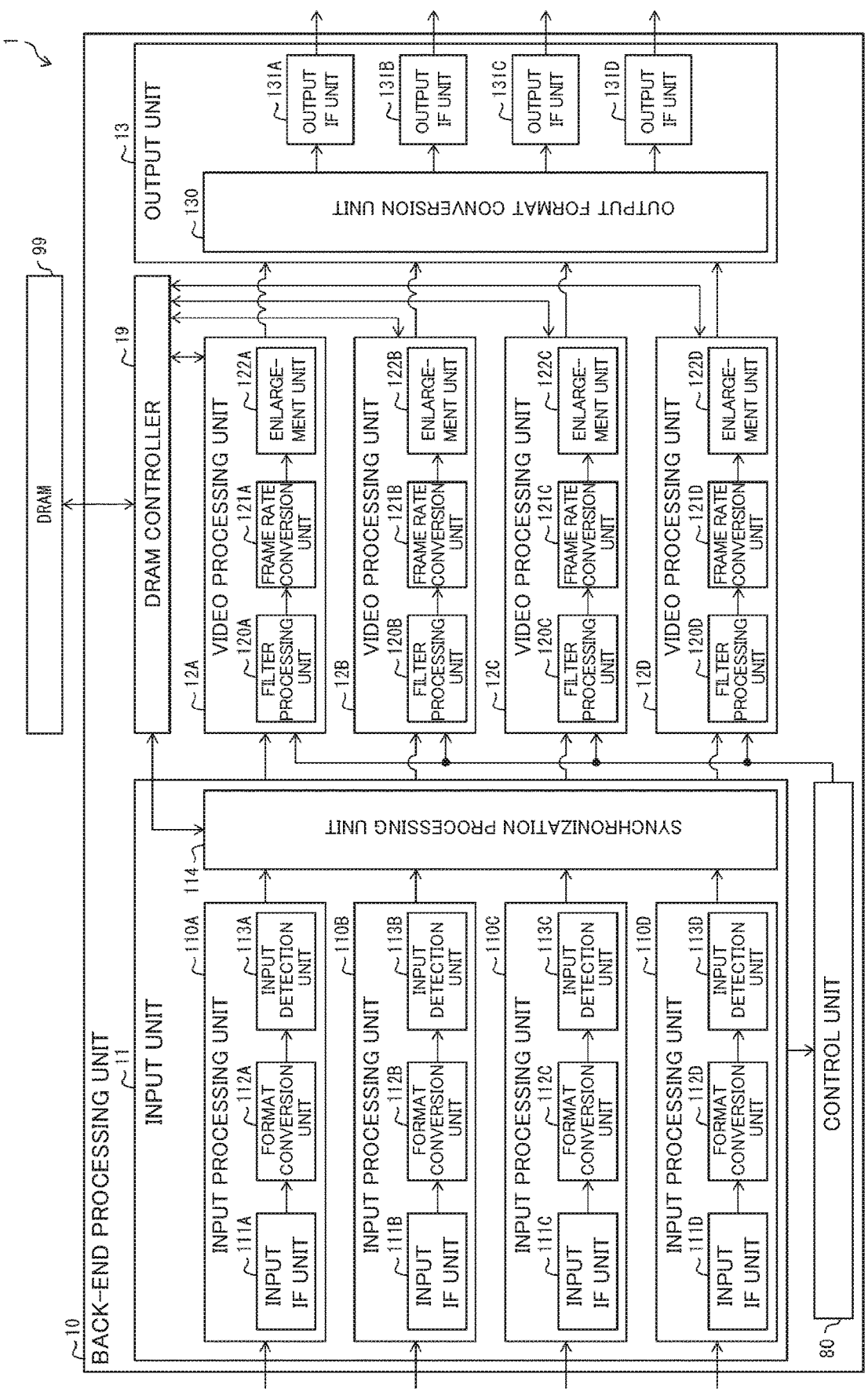
FIG. 2 is a functional block diagram showing a configuration of a back-end processing unit in the display device in FIG. 1 in more detail.

FIG. 2 is a functional block diagram showing a configuration of the back-end processing unit 10 in more detail. In FIG. 2, suffixes "A" to "D" may be used to indicate the units corresponding to the first to fourth input videos (or the first to fourth output videos), respectively. In FIG. 2 and the subsequent drawings, the display unit 70, the user operation reception unit 75, and the storage unit 90 are appropriately omitted for simplicity.

Hereinafter, for convenience of explanation, each unit with a suffix "A" (each unit corresponding to the first input video or the first output video) will be mainly described. The configurations and operations of the respective units (units corresponding to the second to fourth input videos and the second to fourth output videos) with the suffixes "B" to "D" are the same as those of the units with the suffix "A", and therefore the description will be appropriately omitted.

Input Unit 11

The input unit 11 receives the first to fourth input videos simultaneously (in parallel). The input unit 11 includes input processing units 110A to 110D and a synchronization processing unit 114. For distinction, the input processing units 110A to 110D may be referred to as first to fourth input processing units, respectively.

The input processing unit 110A includes an input IF (Interface) unit 111A, a format conversion unit 112A, and an input detection unit 113A. Similarly, the input processing units 110B to 110D include input IF units 111B to 111D, format conversion units 112B to 112D, and input detection units 113B to 113D, respectively.

Each of the input IF units 111A to 111D is an HDMI (High-Definition Multimedia Interface) (registered trademark) port. Specifically, each of the input IF units 111A to 111D is an HDMI 2.0 port (port corresponding to the HDMI 2.0 standard) capable of acquiring 4K2K video. At present, input IF standards that can support 8K4K video is not widespread. Therefore, as described above, in Embodiment 1, four 4K2K video signals are acquired by the input IF units 111A to 111D that satisfy the 4K2K video standard.

In this specification, each of a plurality of videos synchronized with each other is also referred to as "synchronous video". Specifically, the synchronous videos mean videos in which (i) timing of vertical synchronization signals (Vsync) and (ii) timing of data enable (DE) signals match each other.

The back-end processing unit 10 transmits each of the four input videos (4K2K videos) as the synchronization signal by corresponding one of four transmission systems (the input processing units 110A to 110D), thereby the back-end processing unit 10 can transmit one 8K4K video (entire input video) to the display unit 70.

Figure 3:
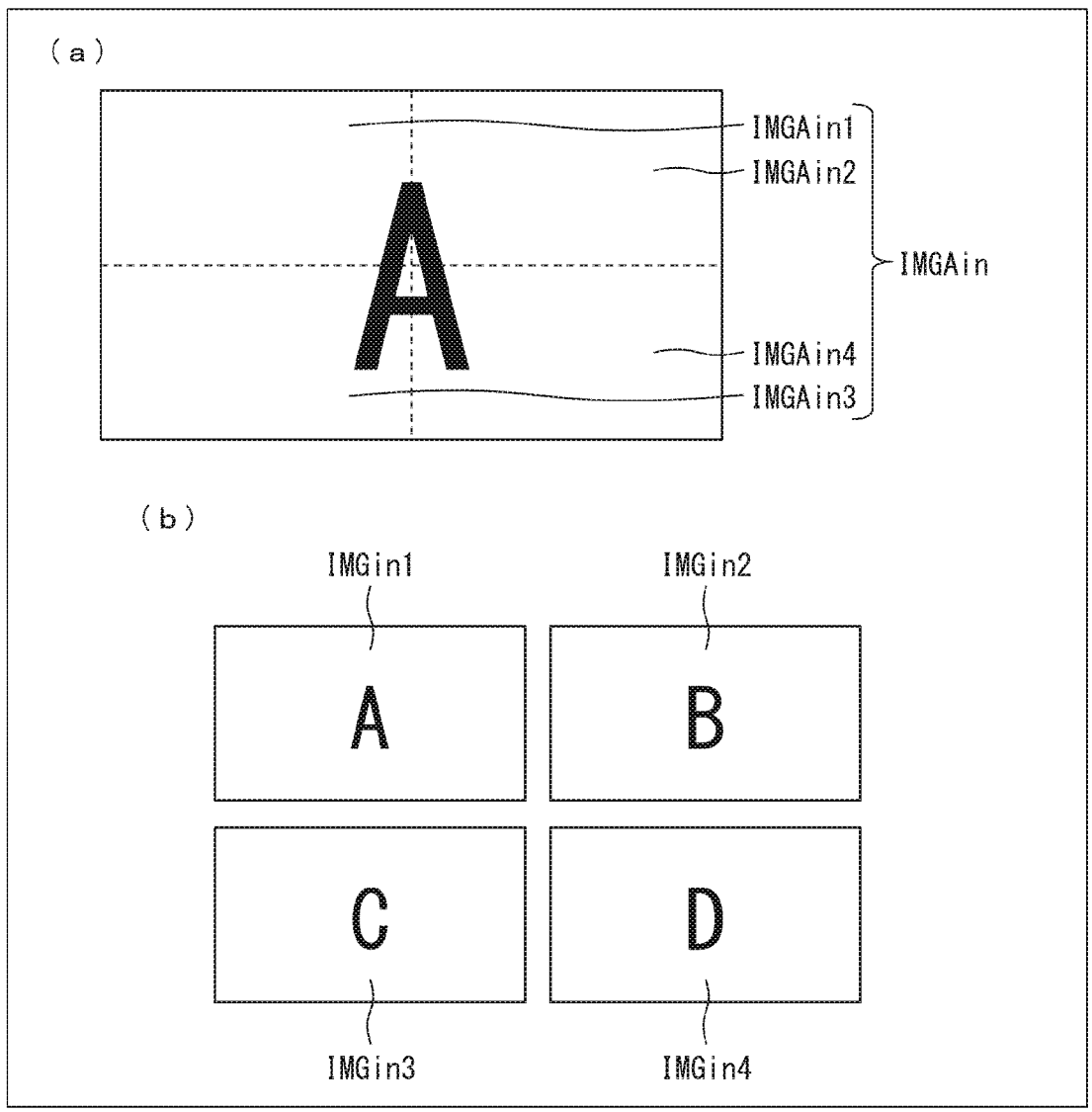
FIG. 3(a) is a diagram showing one entire input video constituted by a plurality of input videos as a synchronous video.
FIG. 3(b) is a diagram showing an example of a plurality of input videos as an asynchronous video.

FIG. 3(a) shows an example of one 8K4K video (entire input video) constituted by four input videos that are synchronous videos. The entire input video means one video (input video) constituted by combining a plurality of input videos. In FIG. 3(a), one entire input video IMGAin (8K4K video) is represented by combining four of a first input video IMGAin1 to a fourth input video IMGAin4. For example, the entire input video IMGAin is video content indicating a sports program.

As described above, four of the first input video IMGAin1 to the fourth input video IMGAin4 are partial areas constituting the one entire input video IMGAin. That is, it may be understood that the one entire input video IMGAin can be divided into four of the first input video IMGAin1 to the fourth input video IMGAin4 (partial areas).

On the other hand, each of the plurality of videos that are not synchronized with each other is also referred to as "asynchronous video". FIG. 3(b) shows a first input video IMGin1 to a fourth input video IMGin4 as examples of four asynchronous videos. The first input video IMGin1 to the fourth input video IMGin4, which are asynchronous videos, are videos having a low correlation (or no correlation) with each other.

For example, it may be expressed as follows,
The first input video IMGAin1: Video content indicating a sports program;
The second input video IMGin2: Video content indicating a news program;
The third input video IMGin3: Video content indicating an entertainment program;
The fourth input video IMGin4: Video content indicating a television animation program;

Note that a virtual entire input video that is not intended by a user is also constituted by four input videos that are asynchronous videos. Similarly, a virtual entire output video (described later) that is not intended by the user is also constituted by four output videos (described later) that are asynchronous videos.

The input IF unit 111A acquires, for example, a broadcast wave (for example, a signal carrying the first input video). The input IF unit 111A decodes the carrier wave and acquires a first input video. Further, the input IF unit 111A acquires first input video information from the broadcast wave. The first input video information is information indicating the content of the first input video. Similarly, the input IF units 111B to 111D acquire the second to fourth input video information (information indicating the contents of the second to fourth input videos), respectively.

The format conversion unit 112A converts the format of the first input video so as to be suitable for synchronization processing and video processing described below. The input detection unit 113A detects first input video content information. The first input video content information may include information indicating (i) content data, (ii) resolution (vertical resolution and horizontal resolution), and (iii) frame rate of the first input video.

The control unit 80 acquires the first to fourth input video content information pieces from the input detection units 113A to 113D, respectively. Further, the control unit 80 determines whether or not the first to fourth input videos are synchronous videos based on the first to fourth input video content information (hereinafter, synchronization determination). An example of a method for performing the synchronization determination (hereinafter, a synchronization determination method) will be described later.

The control unit 80 outputs a control value CV indicating the result of the synchronization determination to the video processing unit 12. For example, when the first to fourth input videos are synchronous videos, the control unit 80 sets CV=1. Further, when the first to fourth input videos are asynchronous videos, the control unit 80 sets CV=0. As described below, the control value CV may be used as a flag value for controlling the video processing unit 12.

After the synchronization determination is performed in the control unit 80, the operation of the synchronization processing unit 114 is started. The synchronization processing unit 114 acquires the first to fourth input videos from the input processing units 110A to 110D, and performs synchronization processing on the first to fourth input videos. The synchronization processing in the synchronization processing unit 114 is executed irrespective of whether the first to fourth input videos are synchronous videos.

Specifically, the "synchronization processing" means processing of adjusting the timing and arrangement of data of each of the first to fourth input videos in order to enable subsequent video processing in the video processing unit 12 (each of the video processing units 12A to 12D). By changing a setting value of the synchronization processing unit 114, the timing at which each video is output from the synchronization processing unit 114 and the arrangement of data of each video can be changed.

The synchronization processing unit 114 accesses the DRAM 99 (for example, DDR memory) via the DRAM controller 19. The synchronization processing unit 114 performs the synchronization processing using the DRAM 99 as a frame memory.

Video Processing Unit 12

The video processing units 12A to 12D simultaneously (in parallel) perform video processing on the first to fourth input videos, in which the synchronization processing is done, respectively. For distinction, the video processing units 12A to 12D may be referred to as first to fourth video processing units, respectively.

The video processing is, for example, processing for improving the image quality of the first to fourth input videos. More specifically, the video processing in the video processing unit 12 means processing performed on each frame of the input video. The video processing includes "boundary processing" and "adjacent boundary processing" described below (see FIGS. 5 and 6 described later).

When the first to fourth input videos are synchronous videos, the video processing units 12A to 12D use the same video processing settings (video processing parameters) to perform the video processing on the first to fourth input videos, respectively. That is, the same video processing setting is applied to the four video processing systems.

On the other hand, when the first to fourth input videos are asynchronous videos, the video processing units 12A to 12D use the different video processing settings to perform the video processing on the first to fourth input videos, respectively. That is, different video processing settings are applied to the respective four video processing systems.

In addition, the video processing unit 12 may change the video processing settings (video processing parameters) according to the control value CV acquired from the control unit 80. That is, the video processing unit 12 may change the content of the video processing according to whether or not the first to fourth input videos are synchronous videos.

Specifically, when CV=1 (when the first to fourth input videos are synchronous videos), the video processing unit 12 performs the adjacent boundary processing on the first to fourth input videos (more specifically, the entire input video constituted by the first to fourth input videos). On the other hand, when CV=0 (when the first to fourth input videos are asynchronous videos), the video processing unit 12 does not perform the adjacent boundary processing on the first to fourth input videos.

The video processing unit 12A includes a filter processing unit 120A, a frame rate conversion unit 121A, and an enlargement unit 122A. Similarly, the video processing units 12B to 12D include filter processing units 120B to 120D, frame rate conversion units 121B to 121D, and enlargement units 122B to 122D, respectively.

The filter processing unit 120A performs filter processing (for example, noise removal processing and edge enhancement processing) on a predetermined area of the first input video. The filter processing is an example of processing performed in the boundary processing and adjacent boundary processing described below.

The frame rate conversion unit 121A converts the frame rate of the first input video in which the filter processing is done. As an example, the frame rate conversion unit 121A increases the frame rate of the first input video from 60 fps (frames per second) to 120 fps. The frame rate conversion unit 121A may perform, for example, de-judder processing.

The frame rate conversion unit 121A accesses the DRAM 99 (for example, DDR memory) via the DRAM controller The frame rate conversion unit 121A converts the frame rate of the first input video using the DRAM 99 as a frame memory.

When it is particularly important to improve the image quality of the first input video, the frame rate conversion unit 121A may further perform motion estimation/motion compensation (MEMC) at the time of the frame rate conversion. In this case, the frame rate conversion unit 121A refers to a pixel adjacent to a certain pixel in the current frame (N-th frame) of the first input video, and derives a motion vector of the current frame.

Thereafter, the frame rate conversion unit 121A generates a frame (interpolated frame) between the immediately preceding frame ((N−1)-th frame) and the current frame using the motion vector. That, is, the frame rate conversion unit 121A improves the image quality of the first input video by performing a frame interpolation. MEMO is an example of the adjacent boundary processing.

The enlargement unit 122A enlarges the first input video in which the frame rate conversion is done. Embodiment 1 exemplifies as an example the case where the video processing is performed on the first input video in the order of "filter processing"→"frame rate conversion"→"enlargement" in the video processing unit 12A. However, the order of each processing in the video processing unit 12A is not limited to this.

The video processing unit 12A supplies the output unit 13 with the first input video in which the video processing is done (hereinafter, the first processed video). Similarly, the video processing units 12B to 12D supply the output unit 13 with the second to fourth processed videos (the second to fourth input videos in which the video processing is done), respectively.

Output Unit 13

The output unit 13 includes an output format conversion unit 130 and output IF units 131A to 131D. The output format conversion unit 130 acquires a plurality of processed videos (first to fourth processed videos) from the video processing units 12A to 12D. The output unit 13 further processes the plurality of processed videos to generate a plurality of output videos (first to fourth output videos).

The output format conversion unit 130 converts the format of the first to fourth processed videos so as to be suitable for display on the display unit 70. The output IF unit 131A supplies the first processed video in which format conversion is done, to the display unit 70 (more specifically, a partial display area 71A) as the first output video. Similarly, the output IF units 131B to 131D supply the second to fourth processed videos in which format conversion is done, to the display unit 70 (more specifically, partial display areas 71B to 71D) as the second to fourth output videos.

FIG. 4(a) shows an example of one entire output video constituted by four output videos that are synchronous videos. The entire output video means one video (output video) constituted by combining a plurality of output videos. In FIG. 4(a), a first output video IMGAout1 to a fourth output video IMGAout4 correspond to the first input video IMGAin1 to fourth input video IMGAin4 in FIG. 3(a). Therefore, the first output video IMGAout1 to fourth output video IMGAout4 are also synchronous videos.

The first output video IMGAout1 to fourth output video IMGAout4 are displayed in partial display areas 71A to 71D (display areas with a resolution of 4K2K), respectively. Therefore, on the display unit 70, one entire output video IMGAout (8K4K video) can be displayed as a combination of the four of the first output video IMGAout1 to the fourth output video IMGAout4. That is, the entire output video IMGAout is an 8K4K video corresponding to the entire input video IMGAin.

FIG. 4(b) shows a first output video IMGout1 to a fourth output video IMGout4 as examples of four asynchronous videos. In FIG. 4(b), the first output video IMGout1 to fourth output video IMGout4 correspond to the first input video IMGin1 to fourth input video IMGin4 in FIG. 3(b). Therefore, the first output video IMGout1 to fourth output video IMGout4 are also asynchronous videos. In this case, in the partial display areas 71A to 71D of the display unit 70, the first output video IMGout1 to the fourth output video IMGout4 having a low correlation (or no correlation) with each other are displayed.

Boundary Processing

Figure 5:
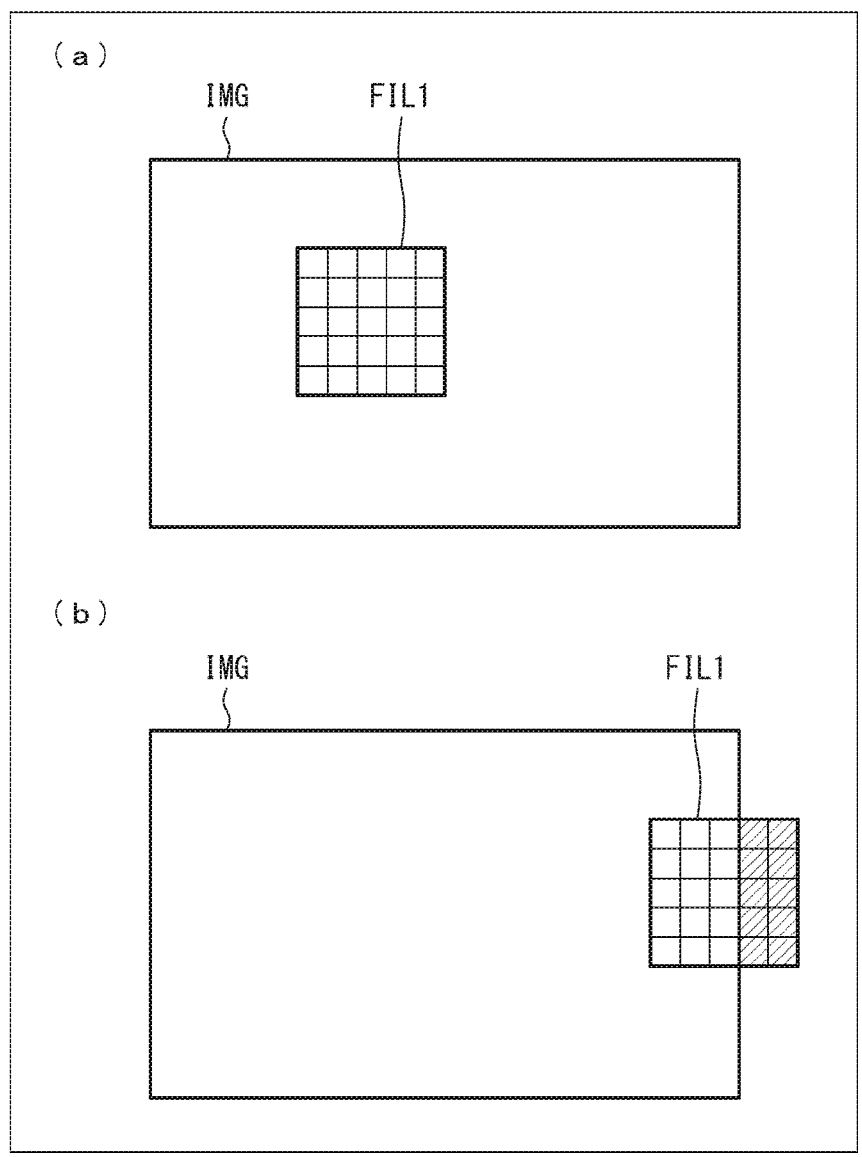

FIG. 5 is a diagram for explaining the boundary processing. FIG. 5 shows a case where the filter processing using a filter FIL1 with 5×5 taps is performed on one image IMG (for example, one frame of a video).

FIG. 5(a) shows a case where the boundary processing is not performed. In FIG. 5(a), the entire filter FIL1 is included inside an image IMG. In this case, in the entire area covered by the filter FIL1, it is possible to perform filter processing on pixels by referring to all pixel data (pixel values) in the image IMG.

FIG. 5(b) shows a case where the boundary processing is performed. In FIG. 5(b), a part (cross hatched portion) of the filter FIL1 is positioned outside the image IMG. In this case, since the pixel of the image IMG does not exist in the cross hatched portion, pixel values cannot be referred to in the cross hatched portion. The same filter processing as in FIG. 5(a) cannot be performed. For example, the same filter coefficient as in the case of FIG. 5(a) cannot be used.

Therefore, it is necessary to change the method of filter processing for pixels according to the position of the pixels covered by the filter FIL1. For example, it is necessary to change the filter coefficient according to the position of the pixels. As described above, when the filter FIL1 is positioned so as to cross the boundary of one image IMG, filter processing according to the position of the filter FIL1 is performed. In this specification, such video processing (image processing) is referred to as boundary processing.

Adjacent Boundary Processing

FIG. 6 is a diagram for explaining the adjacent boundary processing. The width of the "boundary", which is a processing range in the adjacent boundary processing, is not limited to one pixel. Therefore, "adjacent boundary" can be read as "adjacent portion". For this reason, the adjacent boundary processing may be referred to as adjacent portion processing.

FIG. 6 shows a case where one image (for example, IMAin) is divided into a plurality of partial areas (for example, IMGAin1 to IMGAin4) The image in FIG. 6 is one frame of the entire input video IMGAin.

In FIG. 6, IMGAin1 to IMGAin4 are represented by characters "A1" to "A4" for simplicity. This is the same in the following drawings. A1 to A4 are also referred to as partial areas. In Embodiment 1, the partial areas A1 to A4 are associated with the partial display areas 71A to 71D.

However, as described in Embodiment 2 described later, the number of partial areas (the number of input videos) does not have to be equal to the number of partial display areas. That is, the partial area does not necessarily have to correspond one-to-one with the partial display area. For example, the number of partial areas may be smaller than the number of partial display areas. As an example, in Embodiment 2, the number of partial areas is two, and the number of partial display areas is four (see FIGS. 12 and 13).

The partial area may be an area that indicates each of the plurality of input videos constituting the entire input video in the entire input video. That is, the partial area only needs to correspond to each of the plurality of input videos constituting the entire input video in the entire input video.

The adjacent boundary processing is one of video processing (image processing) performed when one video (image) is divided into a plurality of partial areas. Specifically, the adjacent boundary processing means "Processing, at a boundary of one partial area with the other partial areas, performed on the boundary of the one divided area with reference to pixel values at the boundary of the other partial area".

In FIG. 6, the entire filter FIL1 is included inside the partial area A1. Therefore, in the partial area A1, in the entire area covered by the filter FIL1, it is possible to perform filter processing on each pixel by referring to all pixel values of the partial area IMG. Thus, the adjacent boundary processing is not performed on the partial area A1.

In contrast to this, a part (cross-hatched portion) of the filter FIL2 in FIG. 6 is not included in the partial area A2. The cross-hatched portion of the filter FIL2 is included in the partial area A1. Therefore, when performing the filter processing on a pixel P2 in FIG. 6 (one pixel at the left end of the partial area A2), it is necessary to refer to a pixel value of a pixel belonging to the partial area A1 (the cross-hatched portion of the filter FIL2). In this way, the filter processing using the filter FIL2 is an example of the adjacent boundary processing.

Further, a part (cross-hatched portion) of a filter FIL4 in FIG. 6 is not included in the partial area A4. The cross-hatched portion of the filter FIL4 is included in the partial areas A1 to A3. Therefore, when the filter processing is performed on a pixel P4 in FIG. 6 (one pixel at the upper left end of the partial area A4), it is necessary to refer to the respective pixel values of (i) pixel values of pixels belonging to the partial area A1 (part of the cross-hatched portion of the filter FIL4), (ii) pixel values of pixels belonging to the partial area A2 (part of the cross-hatched portion of the filter FIL4), and (iii) pixel values of pixels belonging to the partial area A3 (part of the cross-hatched portion of the filter FIL4). As described above, the filter processing using the filter FIL4 is also an example of the adjacent boundary processing.

Here, one partial area (for example, A1) among a plurality of partial areas (for example, A1 to A4) is referred to as a first partial area. Further, among the plurality of partial areas, a partial area (for example, A2 to A4) adjacent to the first partial area is referred to as a second partial area.

In this case, the "adjacent boundary processing" can be expressed as "Processing, at a boundary between the first partial area (for example, A1) and the second partial area (A2 to A4), performed on the other of the first partial area and the second partial area with reference to pixel values in one of the first partial area and the second partial area".

Example of Synchronization Determination Method

Examples of the synchronization determination method in the control unit 80 include the following methods 1 to 3. The control unit 80 may determine whether or not the plurality of input videos (for example, the first to fourth input videos) is a synchronous video by using at least one of methods 1 to 3.

(Method 1): Synchronization determination is performed using input video information. More specifically, the synchronization determination is performed based on a content type of an input video. As an example, in the HDMI standard, a bit which is indicating a content type of the input video is defined in AVIInfoFrame of the input video.

For example, a case where the first to fourth input videos are synchronous videos which are intended to constitute one 8K4K video (entire input video) may be considered. In this case, in each of the bits, the content type of each of the first to fourth input videos is indicated as "8K4K video". Therefore, when the content type of each of the first to fourth input videos matches a predetermined content type (for example, 8K4K video), the control unit 80 may determine that the first to fourth input videos are synchronous videos.

On the other hand, when the first to fourth input videos are asynchronous videos, in each of the bits, the content type of each of the to fourth input videos is indicated as "4K2K video". Therefore, when the content type of each of the first to fourth input videos does not match the predetermined content type (for example, 8K4K video), the control unit 80 may determine that the first to fourth input videos are asynchronous videos.

(Method 2): Synchronization determination is performed using input video information. More specifically, the synchronization determination is performed based on the resolution (vertical resolution and horizontal resolution) and the frame rate of the input video indicated in the input video information.

When the first to fourth input videos have the same resolution and frame rate, the control unit 80 may determine that the first to fourth input videos are synchronous videos. This is because the resolution and the frame rate of each input video are set to be the same when the first to fourth input videos are synchronous videos intended to constitute one 8K4K video (entire input video).

On the other hand, when at least one of the resolution and the frame rate differs between the input videos, it may be said that the first to fourth input videos are likely to be asynchronous videos. This is because the first to fourth input videos that are asynchronous videos have low correlation (or no correlation) with each other. Therefore, when at least one of the resolution and the frame rate does not match between the first to fourth input videos, the control unit 80 may determine that the first to fourth input videos are asynchronous videos.

(Method 3): The synchronization determination is performed by focusing on skew of vertical synchronization signals between a plurality of input videos. According to method 3, the synchronization determination can be performed with higher accuracy than method 2. According to method 3, even for a plurality of asynchronous videos having the same resolution and frame rate, it can be appropriately determined that the videos are asynchronous videos.

FIG. 7 is a diagram for explaining method 3. In FIG. 7, two input videos, "input video 0" and "input video 1" are considered. The input video 0 and the input video 1 are asynchronous videos having the same resolution and frame rate.

Note that, in FIG. 7, the symbols for the input video 0 are as follows.

Vsnc0: Vertical synchronization signal of the input video 0

DE0: Data enable signal of the input video 0

DE_CNT0: Counter value of the data enable signal of the input video 0

Similarly, the symbols related to the input video 1 are as follows.

Vsync1: Vertical synchronization signal of the input video 1

DE1: Data enable signal of the input video 1 DE_CNT1: Counter value of the data enable signal of the input video 1

As shown in FIG. 7, DE_CNT0 indicates a value obtained by counting the pulses of DE0. When DE0 becomes OFF (Low) (when Vsync0 becomes ON (High)), DE_CNT0 is reset to 0. Note that DE_CNT0 takes any integer value from 0 to 5. The same applies to DE_CNT1.

When the input videos 0 and 1 are asynchronous videos, the difference between the timing at which Vsync0 becomes ON and the timing at which Vsync1 becomes ON increases as time elapses. Therefore, when the input videos 0 and 1 are asynchronous videos, it is common that DE_CNT0 and DE_CNT1 take different values at one point in time.

From the above, when the input videos 0 and 1 are asynchronous videos, $\Delta=|DE\_CENT0-DE\_CNT1|$ is expected to have a larger value than when the input videos 0 and 1 are synchronous videos. $\Delta$ is also referred to as skew between the input videos 0 and 1. $\Delta$ can be used as an index indicating the shift of timing (asynchronism).

The control unit 80 may perform the synchronization determination by determining whether or not $\Delta$ is equal to or less than a predetermined threshold value $\alpha$. Specifically, when the condition of $\Delta \leq \alpha$ (hereinafter, skew condition) is satisfied, the control unit 80 may determine that the input videos 0 and 1 are synchronous videos. On the other hand, when $\Delta > \alpha$ (when the skew condition is not satisfied), the control unit 80 may determine that the input videos 0 and 1 are asynchronous videos.

In other words, the control unit 80 may determine that the input videos 0 and 1 are synchronous videos when the shift of timing is within the predetermined range. On the other hand, when the shift of timing is not within the predetermined range, the control unit 80 may determine that the input videos 0 and 1 are asynchronous videos.

As an example, as shown in FIG. 7, at the timing when Vsync0 becomes ON, DE_CNT0 and DE_CONT1 are read. In this case, $\Delta=|0-4|=4$. For example, a case where $\alpha=3$ is set, is considered. In this case, since $\Delta > \alpha = 3$, the skew condition is not satisfied. Therefore, the control unit 80 can determine that the input videos 0 and 1 are asynchronous videos.

The control unit 80 may perform a synchronization determination based on the skew condition for each of the first to fourth input videos. Specifically, when the skew condition is satisfied for all of the first to fourth input videos, the control unit 80 determines that the first to fourth input videos are synchronous videos. On the other hand, when there is a set of input videos that do not satisfy the skew condition among the first to fourth input videos, the control unit 80 determines that the first to fourth input videos are asynchronous videos.

Note that when $\alpha$ is set to be too small, it is not possible to appropriately perform the synchronization determination. For example, when it is set to $\alpha=3$, it can be expressed as $\Delta < \alpha = 3$, and the skew condition is not satisfied. Therefore, it is erroneously determined that the input videos 0 and 1 are synchronous videos. Therefore, a needs to be set to a large value to some extent.

Note that, in the synchronization processing unit 114, synchronization between input videos is performed in units of lines (systems). When the synchronization is performed on a line basis, a line memory is required. When the value of $\Delta$ is equal to or greater than the number of line memories (hereinafter, line memory count), the input video is processed as an asynchronous video. Therefore, $\alpha$ depends on the line memory count. For example, when the line memory count is two, it can be expressed as $\Delta=2$. Note that the line memory count depends on the content of the video processing of the video processing unit 12.

Example of Further Improvement of Method 3

As described above, when the input videos 0 and 1 are asynchronous videos, the above shift of timing becomes larger as time elapses. Therefore, depending on the timing at which DE_CNT0 and DE_CNT1 are read, even if the input videos 0 and 1 are asynchronous videos, there is a possibility that it is expressed as $x \leq \alpha$.

That is, when the skew condition is continuously determined for a long time, there may be a possibility that the skew condition is accidentally satisfied. This is because the possible values of each of DE_CNT0 and DE_CNT1 are limited to 0 to 5.

Therefore, after it is determined that the skew condition is satisfied once and then it is determined that the skew condition is not satisfied, the control unit 80 may determine that the input videos 0 and 1 are asynchronous videos. Then, the control unit 80 may stop the subsequent determination processing with the skew condition. That is, the control unit 80 may fix the determination result (control value CV). Thereby, the synchronization determination can be performed with higher accuracy.

Example of Processing Flow in Display Device 1

FIG. 9 is a flowchart showing an example of a processing flow in the display device 1 (the back-end processing unit 10). First, the processing S1 to S4 in FIG. 8(*a*) will be described. The input unit 11 acquires a plurality of input videos (for example, first to fourth input videos) (S1). The control unit. 80 determines whether or not the input videos are synchronous videos (S2, control step).

When the input videos are synchronous videos (YES in S2), the video processing unit 12 performs the adjacent boundary processing on the input videos (S3, video processing step). On the other hand, when the input videos are asynchronous videos (NO in S2), the video processing unit 12 does not perform the adjacent boundary processing on the input videos (S4, video processing step).

Figure 8:
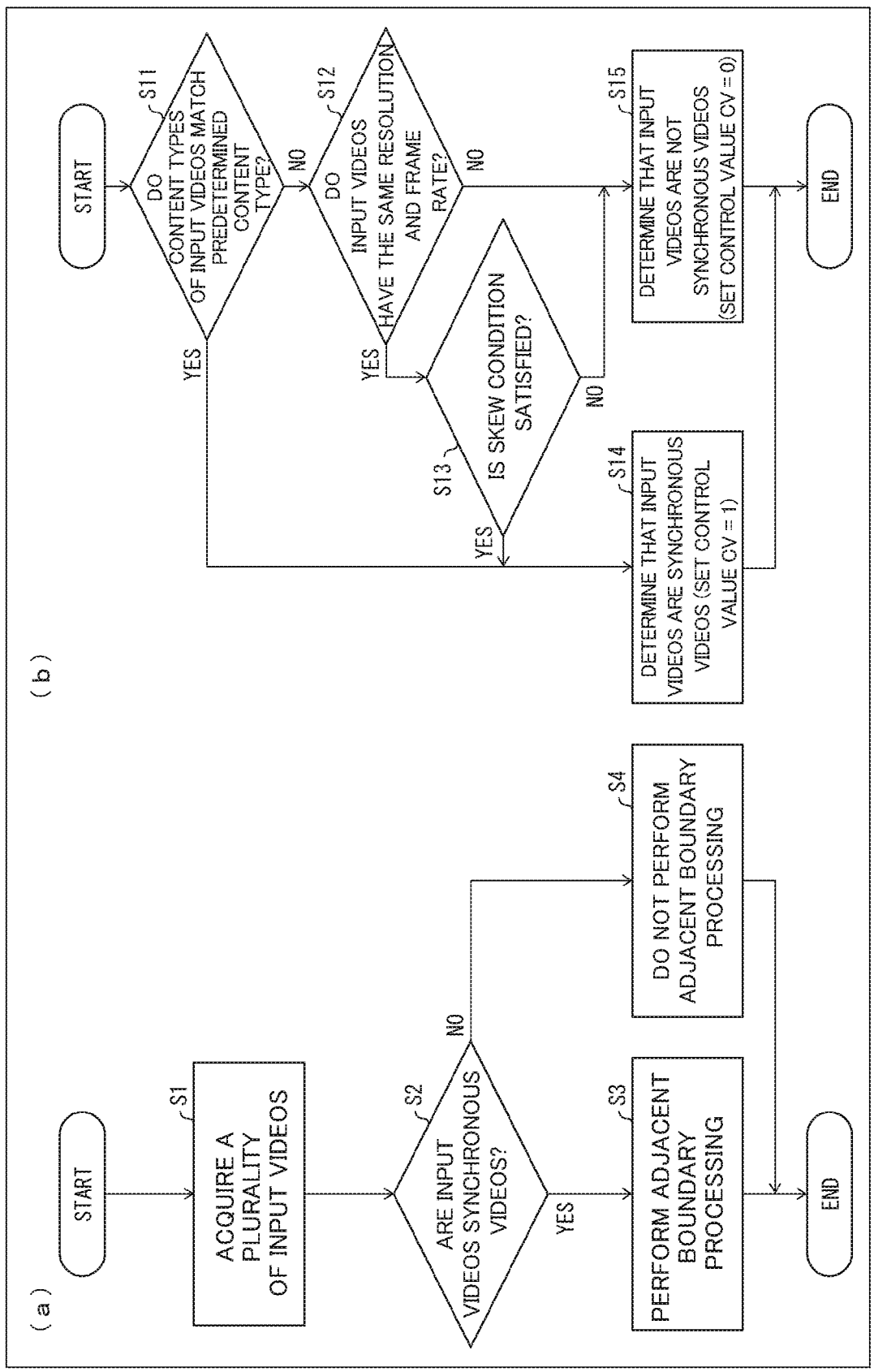

The processing S11 to S13 in FIG. 8(*b*) show the content of S2 (control step) in FIG. 8(*a*) more specifically. In FIG. 8(*b*), the synchronization determination is performed by combining the above-described methods 1 to 3. First, the control unit 80 determines whether or not content types of the input videos match a predetermined content type as in the above-described method 1 (S11).

When the content types of the input videos match the predetermined content type (YES in S11), the control unit 80 determines that the input videos are synchronous videos. Therefore, the control unit 80 sets the control value CV to 1 (S14). As shown in S3 described above, when the control value is set as CV=1, the video processing unit 12 starts the adjacent boundary processing on the input videos.

On the other hand, when the content types of the input videos do not match the predetermined content type (NO in S11), the control unit 80 determines whether or not the input videos have the same resolution and frame rate as in method 2 described above (S12).

When the input videos have the same resolution and frame rate (YES in S12), the process proceeds to S13. That is, the control unit 80 further determines whether or not the skew condition is satisfied as in the above-described method 3 (S13). When the skew condition is satisfied (YES in S13), the process proceeds to S14 described above.

On the other hand, when the input videos do not have the same resolution and frame rate (NO in S12) or when the skew condition is not satisfied (NO in S13), the control unit 80 determines that the input videos are asynchronous videos (not synchronous videos). Therefore, the control unit 80 sets the control value CV to 0 (S15). As shown in S4 described above, when the control value is set as CV=0, the video processing unit 12 does not perform the adjacent boundary processing on the input videos.

Effects of Display Device 1

According to the display device 1, it is possible to arbitrarily perform the adjacent boundary processing on a plurality of input videos according to the control value CV. Therefore, it is possible to prevent a decrease in display quality at each boundary of a plurality of partial areas (for example, partial areas A1 to A4 as 4K2K video) constituting one entire output video (for example, 8K4K video).

FIG. 9 are diagrams showing a state of video processing when four input videos (IMGAin1 to IMGAin4) are synchronous videos. As shown in FIG. 9(*a*), the adjacent boundary processing by the video processing unit 12 can be performed on four synchronous videos.

For example, in the video processing unit 12, the frame rate conversion units 121A to 121D may perform MEMC. Further, in the video processing unit 12, the enlargement units 122A to 122D may refer to the pixel values of the adjacent pixels positioned in the second partial area when the pixels positioned at the boundary of the first partial area are enlarged.

Therefore, four processed videos (first to fourth processed videos) with improved display quality at each boundary can be obtained. That is, it is possible to improve the display quality of one entire video (hereinafter, entire processed video) constituted by the four processed videos. Similarly, four output videos with improved display quality at each boundary can be obtained. As a result, it is possible to improve the display quality of one entire output video (for example, IMGAout) constituted by four output videos (for example, IMGAout1 to IMGAout4).

As shown in FIG. 9(*b*), when the input videos are synchronous videos, the video processing unit 12 may further perform the boundary processing on the entire input video. Specifically, as shown in FIG. 9(*b*), the boundary processing may be further performed on a peripheral portion of the entire input video. As a result, it is possible to improve the display quality of the entire output video (the entire processed video). However, the boundary processing need not always be performed.

FIG. 10 is a diagram showing a state of video processing when four input videos (IMGin1 to IMGin4) are asynchronous videos. In FIG. 10, IMGin1 to IMGin4 are represented by characters "A" to "D" for simplicity. This is the same in the following drawings. Further, A to D are also referred to as partial areas. The partial areas A to D are associated with the partial display areas 71A to 71D.

When the plurality of input videos are asynchronous videos, the plurality of videos has a low correlation with each other (or have no correlation). For this reason, when the adjacent boundary processing is performed, the display quality at each boundary of the plurality of partial areas (A to D) constituting one virtual entire output video may be decreased.

However, in the related art, the idea of switching the performing of adjacent boundary processing is not considered. Therefore, in the related art, there is a problem that even when the input videos are asynchronous videos, the adjacent boundary processing is performed as in the case of the synchronous videos.

In contrast to this, as shown in FIG. 10(*a*), according to the display device 1, the adjacent boundary processing by the video processing unit 12 is not performed on the asynchronous videos. Therefore, even when a plurality of output videos (for example, IMGout1 to IMGout4), which is an asynchronous video, is displayed in each partial display area, it is possible to prevent a decrease in display quality.

For example, in the video processing unit 12, the frame rate conversion units 121A to 121D perform frame repeat without performing MEMC. Further, in the video processing unit 12, when each pixel is enlarged, the enlargement units 122A to 122D do not refer to the pixel values of adjacent pixels. That is, the enlargement units 122A to 122D perform simple enlargement (pixel repeat).

As shown in FIG. 10(b), when the input videos are asynchronous videos, the video processing unit 12 may perform the boundary processing on each input video. Specifically, as shown in FIG. 10(b), the boundary processing may be performed on a peripheral portion of each input video. Thereby, even when the input videos are asynchronous videos, the display quality of each of the plurality of output videos (processed video) can be further improved. However, the boundary processing need not always be performed.

As described above, according to the display device 1, it is possible to switch the performing of the adjacent boundary processing depending on whether or not the input videos are synchronous videos or asynchronous videos. That is, more appropriate video processing can be performed on each of the synchronous videos and the asynchronous videos. As a result, it is possible to provide a video with a more superior display quality than in the related art.

Modification Example (1) Embodiment 1 exemplifies as an example the case where each input video is a 4K2K video and the entire input video is an 8K4K video. However, the resolutions of the input video and the entire input video are not limited to these. Similarly, the resolution of the entire output video is not particularly limited. The display device 1 only needs to switch the performing of the adjacent boundary processing on a plurality of input videos according to the control value CV.

(2) The control unit 80 does not necessarily need to set the control value CV according to the synchronization determination result. That is, the control value CV does not necessarily need to indicate "whether or not the input videos are synchronization signals". The control value CV may be arbitrarily set by a user.

For example, the user operation reception unit 75 may receive a user operation for setting the control value CV (for example, pressing a predetermined button on a remote controller). The control unit 80 may set the control value CV according to the user operation received by the user operation reception unit 75.

(3) The control unit 80 may set the control value CV based on the result of analyzing an input video. The above-described synchronization determination is a specific example of the above analysis. However, the analysis is not limited to only the synchronization determination.

Further, the control unit 80 may operate at least two of the video processing units among the video processing units 12A to 12D according to the result of analyzing a plurality of input videos. That is, the control unit 80 may cause the video processing unit 12 to process at least two input videos according to the result of analyzing the plurality of input videos.

Embodiment 2

FIG. 11 is a diagram for explaining input videos and output videos on a display device 2 according to Embodiment 2. In Embodiment 2, unlike Embodiment 1, two input videos (first input video and second input video) are supplied to the display device 2 as a plurality of input videos.

Therefore, in FIG. 11, arrows corresponding to the third input video and the fourth input video in FIG. 1 are indicated by dotted lines.

In Embodiment 2, the first input video and the second input video are processed by the video processing units 12A and 12B, respectively, and the first processed video and the second processed video are generated. Unlike Embodiment 1, the third processed video and the fourth processed video are not generated in the video processing units 120 and 120. For this reason, in FIG. 11, arrows corresponding to the third processed video and the fourth processed vide in FIG. 1 are indicated by dotted lines.

The output unit 13 acquires the first processed video and the second processed video from the video processing units 12A and 12B. Unlike Embodiment 1, the output unit 13 of Embodiment 2 generates first to fourth output videos by dividing a part of the first processed video and the second processed video. In Embodiment 2, by arranging two 4K2K videos (input videos) that are synchronous videos in the horizontal direction, an example in which one 8K2K video (video having a resolution of 7680 horizontal pixels×2160 vertical pixels) is constituted as the entire input video will be described. In this way, in Embodiment 2, the number of partial areas (the number of input videos) is different from the number of partial display areas.

FIG. 12(a) shows an example of an entire input video according to Embodiment 2. In FIG. 12(a), one entire input video IMGAin1v is represented by combining two first input video IMGAin1v and the second input video IMGAin2v, which are synchronous videos. FIG. 12(b) shows a first input video IMGin1v and a second input video IMGin2v as an example of two asynchronous videos.

FIG. 13(a) shows an example of one entire output video (IMGAoutv) constituted by four output videos (first output video IMGAout1v to fourth output video IMGAout4v) which are synchronous videos. In FIG. 13(a), the first output video IMGAout1v and the third output video IMGAout3v correspond to the first input video IMGAin1v in FIG. 12(a).

Specifically, the output unit 13 generates a video in which the entire area from the upper end of the first input video IMGAin1v (more strictly, the first processed video) to ¼ of the vertical direction resolution is replaced with a black background. The output unit 13 outputs the video as a first output video IMGAout1v. Further, the output unit 13 generates a video in which the entire area from the bottom end of the first input video IMGAin1v (more strictly, the first processed video) to ¼ of the vertical direction resolution is replaced with a black background. The output unit 13 outputs the video as a third output video IMGAout3v.

Similarly, the second output video IMGAout2v and the fourth output video IMGAout4 correspond to the second input video IMGAin2v in FIG. 12(a). Specifically, the output unit 13 generates a video in which the entire area from the upper end of the second input video IMGAin2v (more strictly, the second processed video) to ¼ of the vertical direction resolution is replaced with a black background. The output unit 13 outputs the video as a second output video IMGAout2v. Further, the output unit 13 generates a video in which the entire area from the bottom end of the second input video IMGAin2v (more strictly, the second processed video) to ¼ of the vertical direction resolution is replaced with a black background. The output unit 13 outputs the video as a fourth output video IMGAout4v.

The first output video IMGAout1v to the fourth output video IMGAout4v are synchronous videos, like the first input video IMGAin1v to the second input video IMGAin2v. The entire output video IMGAoutv is a video corresponding to the entire input video IMGAinv. IMGAoutv is an 8K4K video, but the actual resolution is 4K2K.

FIG. 13(b) shows a first output video IMGout1v to a fourth output video IMGout4v as an example of four asynchronous videos. In FIG. 13(b), the first output video IMGout1v and the third output video IMGout3v correspond to the first input video IMGin1v in FIG. 12(b).

Specifically, the output unit 13 generates a video in which the entire area from the upper end of the first input video IMGin1v (more strictly, the first, processed video) to ¼ of the vertical direction resolution is replaced with a black background. The output unit 13 outputs the video as a first output video IMGout1v. Further, the output unit 13 generates a video in which the entire area from the bottom end of the first input video IMGin1v (more strictly, the first processed video) to ¼ of the vertical direction resolution is replaced with a black background. The output unit 13 outputs the video as a third output video IMGout3v.

Similarly, the second output video IMGout2v and the fourth output video IMGout4v correspond to the second input video IMGin2v in FIG. 12(b). Specifically, the output unit 13 generates a video in which the entire area from the upper end of the second input video IMGin2v (more strictly, the second processed video ¼ of the vertical direction resolution is replaced with a black background. The output unit 13 outputs the video as a second output video IMGout2v. Further, the output unit 13 generates a video in which the entire area from the bottom end of the second input video IMGin2v (more strictly, the second processed video) to ¼ of the vertical direction resolution is replaced with a black background. The output unit 13 outputs the video as a fourth output video IMGout4v.

The first output video IMGout1v to the fourth output video IMGout4v are asynchronous videos, like the first input video IMGin1v to the second input video IMGin2v.

Figure 14:
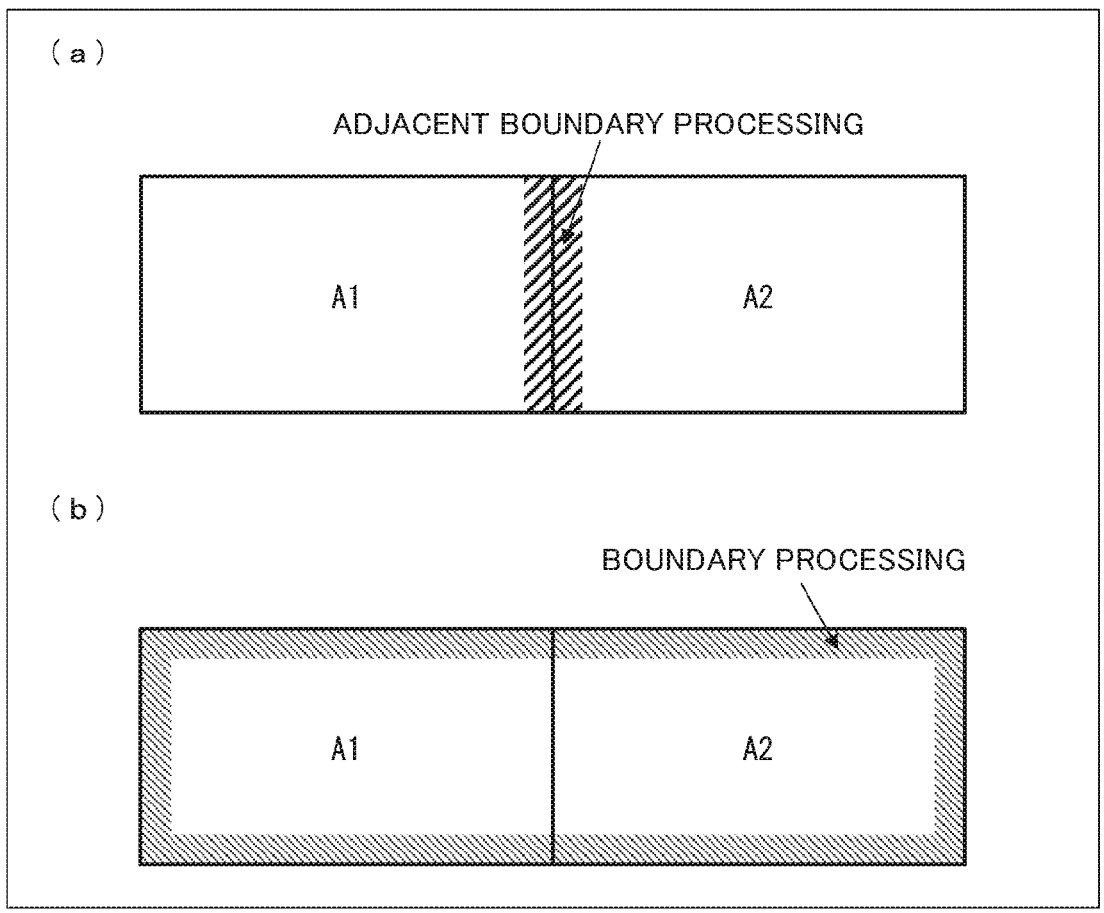

FIG. 14 is a diagram showing a state of video processing when two input videos (IMGAin1v to IMGAin2v) are synchronous videos. As shown in FIG. 14(a), the adjacent boundary processing by the video processing unit 12 can be performed on two synchronous videos. As shown in FIG. 14(b), the boundary processing may be further performed on a peripheral portion of the entire input video.

Figure 15:
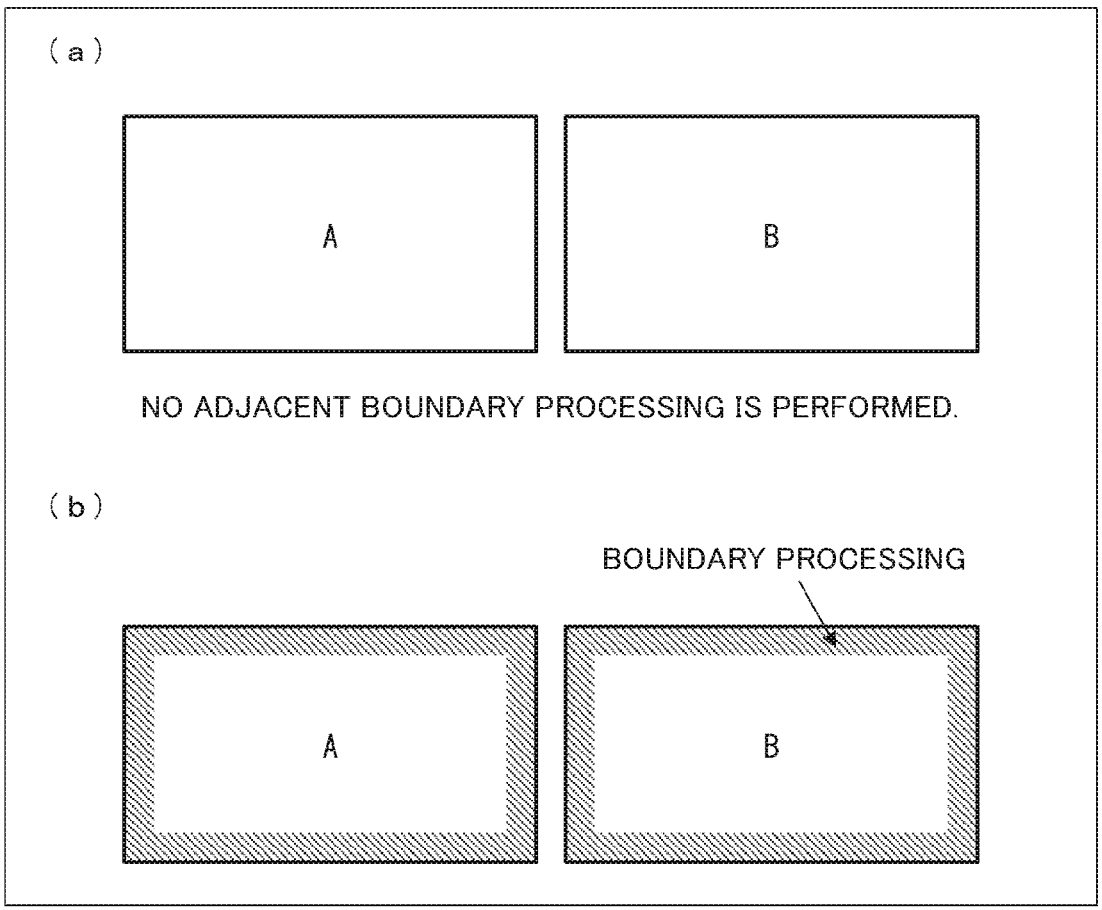

FIG. 15 is a diagram showing a state of video processing when two input videos (IMGin1v to IMGin2v) are asynchronous videos. As shown in FIG. 25(a), similarly to Embodiment 1, the adjacent boundary processing by the video processing unit 12 is not performed on the asynchronous videos. As shown in FIG. 15(b), the boundary processing may be further performed on a peripheral portion of each output video.

As described above, in the display device according to an aspect of the present disclosure, the number of input videos may be smaller than the number of input IF units. The number of input videos may be plural. For example, three input videos may be input to the input unit. Similarly, the number of transmission systems and video processing systems in the back-end processing unit 10 is not limited to four.

Embodiment 3

FIG. 16 is a functional block diagram showing a configuration of a display device 3 according to Embodiment 3. The back-end processing unit 30 of the display device 3 (video processing device) has a configuration in which the control unit 80 is removed from the back-end processing unit 10 in Embodiment 1. In the display device 3, the control unit 80 is provided outside the back-end processing unit 10. In this way, the control unit 80 does not necessarily need to be provided inside the back-end processing unit.

Embodiment 4

FIG. 17 is a functional block diagram showing a configuration of a display device 4 according to Embodiment 4. The back-end processing unit 40 of the display device 4 (video processing device) has a configuration in which the output unit 13 is replaced with the output unit 43 in the back-end processing unit 10 in Embodiment 1. The output unit 43 differs from the output unit 13 in having one output IF unit 431.

The output IF unit 431 supplies the first to fourth output videos to the display unit 70 (partial display areas 71A to 71D). As described above, the output IF unit can be integrated.

Modification Example

FIG. 18 is a functional block diagram showing a configuration of a display device 4v as one modification of Embodiment 4. The back-end processing unit 40v of a display device 4v (video processing device) has a configuration in which the control unit 80 is removed from the back-end processing unit 40 of Embodiment 4. In the display device 4v, the control unit 80 is provided outside the back-end processing unit 10. In this way, the configurations of Embodiments 3 and 4 can be combined.

Embodiment 5

Unlike the above embodiments, the back-end processing unit can be divided into a plurality of function units. That is, the number of back-end processing u is not limited to one. As an example, the back-end processing unit may be realized as two separate function units.

Implementation Example by Using Software

Control blocks of the display devices 1 to 4v (particularly, the back-end processing units 10 to 40v and the control unit 80) may be realized by a logic circuit (hardware) formed on an integrated circuit (IC chip) or the like, or realized by software.

In the latter case, the display devices 1 to 4v include a computer that executes instructions of a program that is software for realizing each function. This computer includes, for example, at least one processor (control device) and at least one computer-readable recording medium storing the program. Further, in the computer, the object of one embodiment of the present disclosure achieved by the processor reading the program from the recording medium and executing the program. As the processor, for example, a central processing unit (CPU) can be used. As the recording medium, a "non-temporary tangible medium" such as a read only memory (ROM), a tape, a disk, a card, a semiconductor memory, a programmable logic circuit, or the like can be used. Further, a random access memory (RAM) or the like for expanding the program may be further provided. The program may be supplied to the computer via any transmission medium (such as a communication network or a broadcast wave) that can transmit the program. Note that one aspect of the present disclosure can also be realized in the form of a data signal embedded in a carrier wave, in which the program is embodied by electronic transmission.

SUMMARY

According to Aspect 1 of the present disclosure, there is provided a video processing device (back-end processing unit 10 and control unit. 80) processing a plurality of input videos (for example, IMGAin1 to IMGAin4), including: a video processing unit (12, 12A to 12D) that processes each of the plurality of input videos; and a control unit (80) that sets a control value (CV) for controlling the video processing unit, in which the video processing unit performs adjacent boundary processing on an entire input video according to the control value, and generates a plurality of processed videos in which an entire input video (for example, IMGAin) is constituted by combining the plurality of input videos, and when in the entire input video, among a plurality of partial areas (for example, A1-AA) associated with of the plurality of respective input videos constituting the entire input video, (i) one of the partial areas is defined as a first partial area (for example, A1), and (ii) another of the partial areas adjacent to the first partial area is defined as a second partial area (for example, A2-A4), and when processing which is performed, by referring to a pixel value in one of the first partial area and the second partial area, on another of the first partial area and the second partial area at a boundary between the first partial area and the second partial area, is defined as adjacent boundary processing, the video processing unit performs the adjacent boundary processing on the entire input video according to the control value, and generates a plurality of processed videos.

According to the above configuration, it is possible to arbitrarily determine whether or not to perform the adjacent boundary processing on the entire input video according to the control value. Therefore, when it is preferable not to perform the adjacent boundary processing (for example, when a plurality of input videos are asynchronous videos), the processed videos can be generated without causing the video processing unit to perform the adjacent boundary processing. That is, only when it is preferable to perform the adjacent boundary processing (for example, when a plurality of input videos are synchronous videos), the processed videos can be generated by causing the video processing unit to perform the adjacent boundary processing. As a result, is possible to provide a video with a more superior display quality than in the related art.

In the video processing device according to Aspect 2 of the present disclosure, in Aspect 1, the control unit may set the control value according to a result of determining whether or not the plurality of input videos are synchronous videos, and the video processing unit may perform the adjacent boundary processing on the entire input video and generate the plurality of processed videos when the plurality of input videos are synchronous videos.

According to the above configuration, it is possible for the control unit to determine whether or not the plurality of input videos are synchronous videos (synchronization determination). Therefore, it is possible to indicate whether or not the plurality of input videos are synchronous videos using the control value. Therefore, only when the plurality of input videos are synchronous videos, the video processing unit can automatically perform the adjacent boundary processing.

In the video processing device according to Aspect 3 of the present disclosure, in Aspect 2, the control unit may determine that the plurality of input videos are synchronous videos when a content type of each of the plurality of input videos matches a predetermined content type.

According to the above configuration, the synchronization determination can be performed based on the content type of each of the plurality of input videos.

In the video processing device according to Aspect 4 of the present disclosure, in Aspect 2 or 3, the control unit may determine that the plurality of input videos are synchronous videos when the plurality of input videos have an identical resolution and frame rate.

According to the above configuration, the synchronization determination can be performed based on the resolution and the frame rate of each of the plurality of input videos. Therefore, the synchronization determination can be performed more reliably.

In the video processing device according to Aspect 5 of the present disclosure, in any one of Aspects 2 to 4, the control unit may determine that the plurality of input videos are synchronous videos when a shift of timing at which each of vertical synchronization signals of the plurality of input videos becomes ON, is within a predetermined range.

According to the above configuration, the synchronization determination can be performed by focusing on the skew of the vertical synchronization signals between the plurality of input videos. Therefore, the synchronization determination can be performed more reliably.

In the video processing device according to Aspect the present disclosure, in any one of Aspects 2 to 5, the video processing unit may further perform boundary processing on the entire input video and generate the plurality of processed videos when the plurality of input videos are synchronous videos.

According to the above configuration, when the plurality of input videos are synchronous videos, it is possible to provide a video (the entire video constituted by the plurality of processed videos and the entire processed video) with a further more superior display quality.

In the video processing device according to Aspect 7 of the present disclosure, in any one of Aspects 2 to 6, the video processing unit may perform the boundary processing on each of the plurality of input videos, and generate the plurality of processed videos, when the plurality of input videos are asynchronous videos.

According to the above configuration, even when the plurality of input videos are asynchronous videos, it is possible to provide a video (each of the plurality of processed videos) with a further more superior display quality.

In the video processing device according to Aspect 8 of the present disclosure, in any one of Aspects 1 to 7, the control unit may set the control value according to a user operation.

In the video processing device according to Aspect 9 of the present disclosure, in any one of Aspects 1 to 8, the control unit may cause the video processing unit to process at least two of the plurality of input videos according to a result of analyzing the plurality of input videos.

A display device (1) according to Aspect 10 of the present disclosure preferably includes the video processing device according to any one of Aspects 1 to 9; and a display unit (70).

According to Aspect 11 of the present disclosure, there is provided a video processing method for processing a plurality of input videos, including: a video processing step of processing each of the plurality of input videos; and a control step of setting a control value for controlling the video processing step, in which an entire input video is constituted by combining the plurality of input videos, and when in the entire input video, among a plurality of partial areas associated with the plurality of respective input videos constituting the entire input video, (i) one of the partial areas is defined as a first partial area, and (ii) another of the partial areas adjacent to the first partial area is defined as a second partial area, and when processing which is performed, by referring to a pixel value in one of the first partial area and the second partial area, on another of the first partial area and the second partial area at a boundary between the first partial area and the second partial area, is defined as adjacent boundary processing, the video processing step further includes steps of performing the adjacent boundary processing on the entire input video according to the control value, and generating a plurality of processed videos.

The video processing device according to each aspect of the present disclosure may be realized by a computer. In this case, a control program of the video processing device that causes the computer to realize the video processing device by operating the computer as each unit (software element) included in the video processing device, and a computer-readable recording medium recording the control program also falls within the scope of one aspect of the present disclosure.

APPENDIX

One aspect of the present disclosure is not limited to the above-described embodiments, and various modifications can be made within the scope of the claims, and embodiments obtained by appropriately combining the technical means disclosed in different embodiments are also included in the technical scope of one aspect of the present disclosure. Further, new technical features can be formed by combining the technical means disclosed in each embodiment.

Another Expression of One Aspect of the Present Disclosure

One aspect of the present disclosure can also be expressed as follows.

That is, a video processing device according to an aspect of the present disclosure includes an input unit, a control unit that determines a control value, a plurality of video processing units that process the input videos separately, and an output unit that outputs a processing result of the video processing unit, in which the video processing unit includes at least an adjacent boundary processing unit, and activates or stops the adjacent boundary processing unit according to the control value.

In the video processing device according to another aspect of the present disclosure, the input unit may include a plurality of input processing units and a synchronization processing unit, in which the plurality of input processing units may simultaneously input video signals, and the synchronization processing unit may synchronize the plurality of video signals input by the plurality of input processing units.

In the video processing device according to still another aspect of the present disclosure, the control unit may analyze information of the video signals input to the plurality of input processing units, and determine the control value based on the analyzed result.

In the video processing device according to still another aspect of the present disclosure, the control unit may analyze at least one of a content type, a frame rate, a resolution, and skew of synchronization signal of the video signal input to each of the input processing units.

In the video processing device according to still another aspect of the present disclosure, the control unit may determine the control value according to a user input.

In the video processing device according to still another aspect of the present disclosure, the video processing unit may include a boundary processing unit.

In the video processing device according to still another aspect of the present disclosure, the control unit may include a function unit that operates at least two video processing units in the plurality of video processing units based on an analysis result from the analysis unit.

A display device according to still another aspect of the present disclosure may include the video processing device according to one aspect of the present disclosure, and a display unit that displays an output of the video processing device.

A video processing method according to still another aspect of the present disclosure includes an input step, a control step of determining a control value, a plurality of video processing steps of processing the input videos separately, and an output step of outputting a processed result of the video processing step, in which the video processing step further includes an adjacent boundary processing step, and the video processing method further includes a step of performing or skipping the adjacent boundary processing step based on the control value.

A video processing program according to still another aspect of the present disclosure includes an input step, a control step of determining a control value, a plurality of video processing steps of processing the input videos separately, and an output step of outputting a processed result of the video processing step, in which the video processing step further includes an adjacent boundary processing step, and the video processing program further includes a step of performing or skipping the adjacent boundary processing step based on the control value.

Further, a recording medium according to still another aspect of the present disclosure may be a computer-readable recording medium that stores the processing program according to one aspect of the present disclosure.

CROSS-REFERENCE OF RELATED APPLICATIONS

This application claims the benefit of priority to Japanese patent application filed on Nov. 1, 2017: Japanese Patent Application No. 2017-212113, and by referencing it, the entire contents thereof are included in this document.

REFERENCE SIGNS LIST 1, 2, 3, 4, 4v DISPLAY DEVICE
10, 30, 40, 40v BACK-END PROCESSING UNIT (VIDEO PROCESSING DEVICE)
12, 12A TO 12D VIDEO PROCESSING UNIT
70 DISPLAY UNIT (DISPLAY SCREEN)
71A TO 71D PARTIAL DISPLAY AREA
80 CONTROL UNIT (VIDEO PROCESSING DEVICE)
A1 PARTIAL AREA (FIRST PARTIAL AREA)
A2 TO A4 PARTIAL AREA (SECOND PARTIAL AREA)
A TO D PARTIAL AREA
CV CONTROL VALUE
IMGAin1 TO IMGAin4, IMGAin1v TO IMGAin2v INPUT VIDEO
IMGin1 TO IMGin4, IMGin1v TO IMGin2v INPUT VIDEO
IMGAin, IMGAinv ENTIRE INPUT VIDEO

The invention claimed is:

1. A video processing device processing a plurality of input videos, comprising:
   a video processing unit that processes each of the plurality of input videos; and
   a control unit that sets a control value for controlling the video processing unit according to a result of determining whether or not the plurality of input videos are synchronous videos wherein
   an entire input video is constituted by combining the plurality of input videos, and
   when in the entire input video, among a plurality of partial areas associated with the plurality of respective input videos constituting the entire input video, (i) one of the partial areas is defined as a first partial area, and (ii) another of the partial areas adjacent to the first partial area is defined as a second partial area, and
   when processing which is performed, by referring to a pixel value in one of the first partial area and the second partial area, on another of the first partial area and the second partial area at a boundary between the first partial area and the second partial area, is defined as adjacent boundary processing,
   the video processing unit performs the adjacent boundary processing on the entire input video according to the control value, and generates a plurality of processed videos,
   the video processing unit performs boundary processing on each of the plurality of input videos and generates the plurality of processed videos, when the control value indicates that the plurality of input videos are asynchronous videos, and
   the boundary processing includes
       first filter processing that is performed when a filter is entirely included inside the first and second partial areas, and
       second filter processing that is performed when a part of the filter is located outside the first and second partial areas, the second filter processing comprising changing a filter coefficient of the filter in accordance with where the filter is located.

2. The video processing device according to claim 1, wherein
   the video processing unit performs the adjacent boundary processing on the entire input video and generates the plurality of processed videos when the plurality of input videos are synchronous videos.

3. The video processing device according to claim 2, wherein the control unit determines that the plurality of input videos are synchronous videos when a content type of each of the plurality of input videos matches a predetermined content type.

4. The video processing device according to claim 2, wherein the control unit determines that the plurality of input videos are synchronous videos when the plurality of input videos have an identical resolution and frame rate.

5. The video processing device according to claim 2, wherein the control unit determines that the plurality of input videos are synchronous videos when a shift of timing at which each of vertical synchronization signals of the plurality of input videos becomes ON is within a predetermined range.

6. The video processing device according to claim 2, wherein the video processing unit further performs boundary processing on the entire input video and generates the plurality of processed videos when the plurality of input videos are synchronous videos.

7. The video processing device according to claim 1, wherein the control unit sets the control value according to a user operation.

8. The video processing device according to claim 1, wherein the control unit causes the video processing unit to process at least two of the plurality of input videos according to a result of analyzing the plurality of input videos.

9. A display device, comprising:
   the video processing device according to claim 1; and
   a display unit.

10. A non-transitory tangible computer-readable recording medium storing a control program for causing a computer to function as the video processing device according to claim 1, the control program causing the computer to function as the video processing unit and the control unit.

11. A video processing method for processing a plurality of input videos, comprising:
    a video processing step of processing each of the plurality of input videos; and
    a control step of setting a control value for controlling the video processing step according to a result of determining whether or not the plurality of input videos are synchronous videos, wherein
    an entire input video is constituted by combining the plurality of input videos, and
    when in the entire input video, among a plurality of partial areas associated with the plurality of respective input videos constituting the entire input video, (i) one of the partial areas is defined as a first partial area, and (ii) another of the partial areas adjacent to the first partial area is defined as a second partial area, and
    when processing which is performed, by referring to a pixel value in one of the first partial area and the second partial area, on another of the first partial area and the second partial area at a boundary between the first partial area and the second partial area, is defined as adjacent boundary processing,
    the video processing step further includes steps of performing the adjacent boundary processing on the entire input video according to the control value, and generating a plurality of processed videos,
    the video processing step includes
        performing boundary processing on each of the plurality of input videos and generating the plurality of processed videos, when the control value indicates that the plurality of input videos are asynchronous videos, and
    the boundary processing includes
        first filter processing that is performed when a filter is entirely included inside the first and second partial areas, and
        second filter processing that is performed when a part of the filter is located outside the first and second partial areas, the second filter processing comprising changing a filter coefficient of the filter in accordance with where the filter is located.

* * * * *